United States Patent
Chen et al.

(10) Patent No.: US 10,837,844 B2
(45) Date of Patent: Nov. 17, 2020

(54) HAPTIC ENGINE HAVING A SINGLE SENSING MAGNET AND MULTIPLE HALL-EFFECT SENSORS

(71) Applicant: Apple Inc., Cupertino, CA (US)

(72) Inventors: Denis G. Chen, San Jose, CA (US); Alex M. Lee, Sunnyvale, CA (US); Shingo Yoneoka, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 78 days.

(21) Appl. No.: 16/130,777

(22) Filed: Sep. 13, 2018

(65) Prior Publication Data

US 2019/0086277 A1 Mar. 21, 2019

Related U.S. Application Data

(60) Provisional application No. 62/560,130, filed on Sep. 18, 2017.

(51) Int. Cl.
 *G01L 1/12* (2006.01)
 *G01D 5/14* (2006.01)
 *G06F 3/01* (2006.01)

(52) U.S. Cl.
 CPC ............... *G01L 1/12* (2013.01); *G01D 5/145* (2013.01); *G06F 3/016* (2013.01)

(58) Field of Classification Search
 CPC .......... G01D 5/145; G08B 6/00; G06F 3/016; H04M 19/047
 USPC .............. 324/207.2, 207.21, 207.24, 207.25, 324/207.26, 251, 252
 See application file for complete search history.

(56) References Cited

U.S. PATENT DOCUMENTS

| | | | |
|---|---|---|---|
| 6,057,753 A * | 5/2000 | Myers ...................... | G08B 6/00 340/407.1 |
| 6,704,001 B1 | 3/2004 | Schena et al. | |
| 7,061,466 B1 | 6/2006 | Moore et al. | |
| 7,561,142 B2 * | 7/2009 | Shahoian ................ | G06F 3/016 345/156 |
| 8,169,402 B2 * | 5/2012 | Shahoian ................ | G06F 3/016 345/156 |
| 8,907,661 B2 | 12/2014 | Maier et al. | |
| 9,459,632 B2 | 10/2016 | Houston et al. | |
| 9,591,221 B2 | 3/2017 | Miller et al. | |
| 9,619,031 B1 | 4/2017 | Hajati et al. | |
| 9,681,053 B2 | 6/2017 | Miller et al. | |
| 9,690,382 B1 | 6/2017 | Moussette et al. | |
| 10,453,315 B1 * | 10/2019 | Chen ..................... | G01D 5/2033 |
| 2003/0080728 A1 * | 5/2003 | Daalmans ............... | G01D 5/202 324/164 |
| 2006/0209019 A1 | 9/2006 | Hu | |
| 2007/0106457 A1 * | 5/2007 | Rosenberg .............. | G01S 19/48 701/532 |

(Continued)

*Primary Examiner* — Patrick Assouad
*Assistant Examiner* — Demetrius R Pretlow
(74) *Attorney, Agent, or Firm* — Fish & Richardson P.C.

(57) ABSTRACT

A haptic engine for measuring displacement of the haptic engine's mass uses a single sensing magnet that is carried by the mass along a driving direction. The haptic engine further uses two or more Hall-effect sensors, which are spaced apart (i) from each other along a direction parallel to the driving direction and (ii) from the single sensing magnet along a direction orthogonal to the driving direction, and are disposed adjacent to an ASIC that receives the sensors' output.

28 Claims, 14 Drawing Sheets

(56) References Cited

U.S. PATENT DOCUMENTS

| | | | |
|---|---|---|---|
| 2007/0209437 A1* | 9/2007 | Xue | B81B 3/0032 |
| | | | 73/514.31 |
| 2014/0191749 A1* | 7/2014 | Bondar | G01B 7/30 |
| | | | 324/207.13 |
| 2015/0349619 A1* | 12/2015 | Degner | H02K 41/0356 |
| | | | 310/12.21 |
| 2016/0258758 A1* | 9/2016 | Houston | G01C 21/20 |
| 2017/0085165 A1 | 3/2017 | Hajati et al. | |
| 2017/0089396 A1 | 3/2017 | Lee et al. | |
| 2017/0133792 A1 | 5/2017 | Werley et al. | |
| 2017/0229951 A1* | 8/2017 | Zhang | H02K 33/18 |
| 2018/0316296 A1* | 11/2018 | Hajati | H02P 25/032 |
| 2018/0329170 A1* | 11/2018 | Huang | G02B 7/10 |
| 2019/0063502 A1* | 2/2019 | Lueck | G01P 3/443 |
| 2019/0339776 A1* | 11/2019 | Rosenberg | G06F 3/0416 |

\* cited by examiner

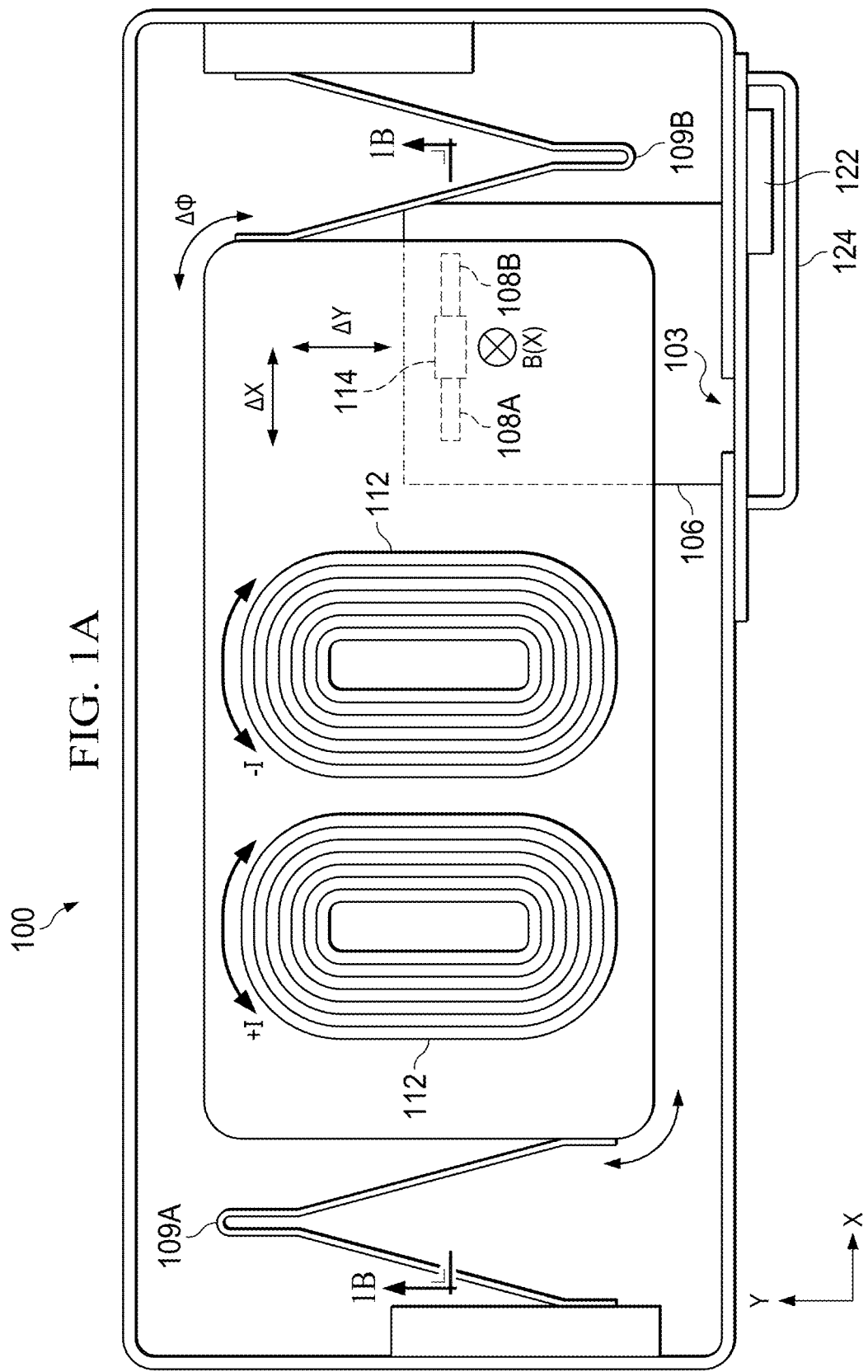

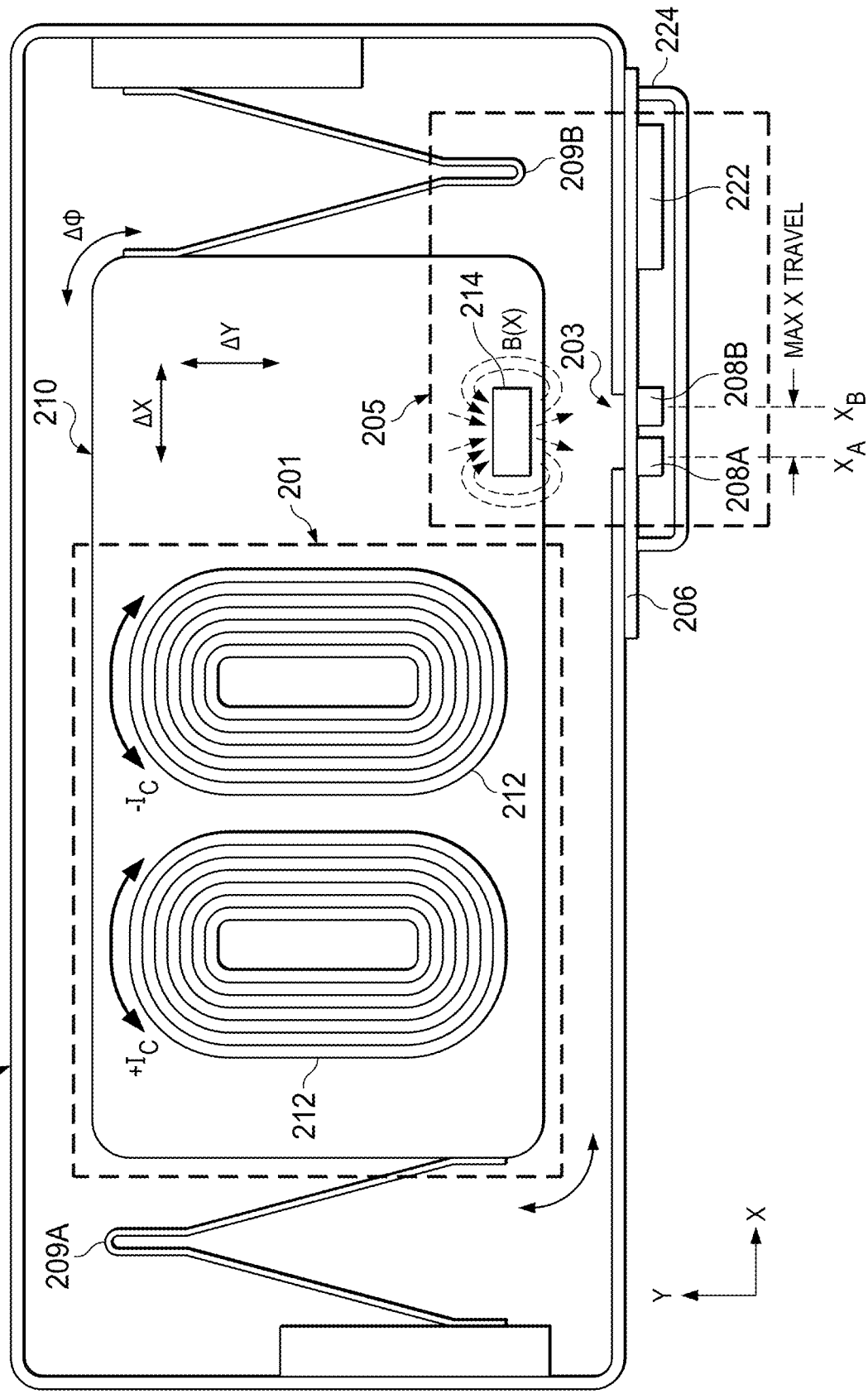

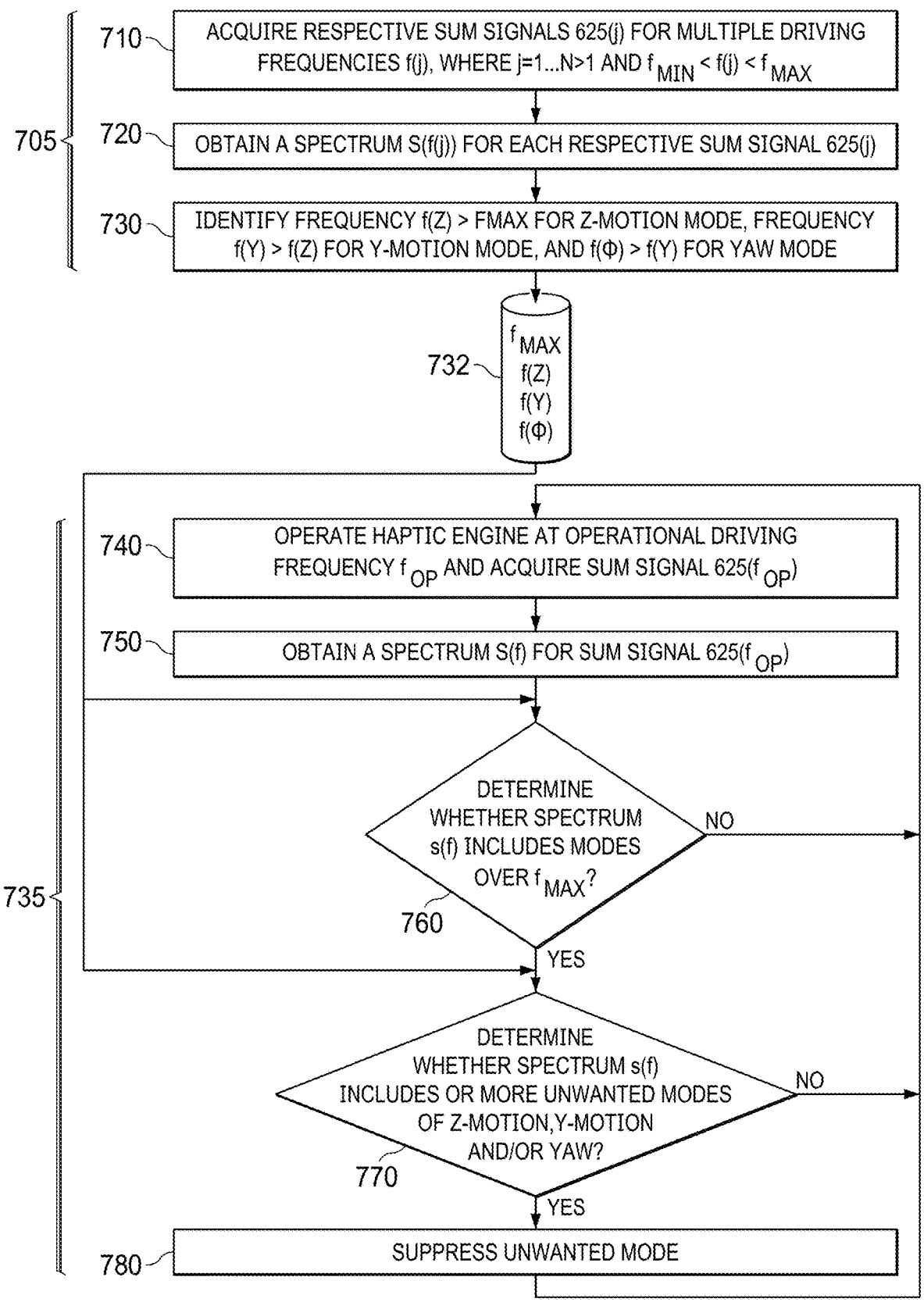

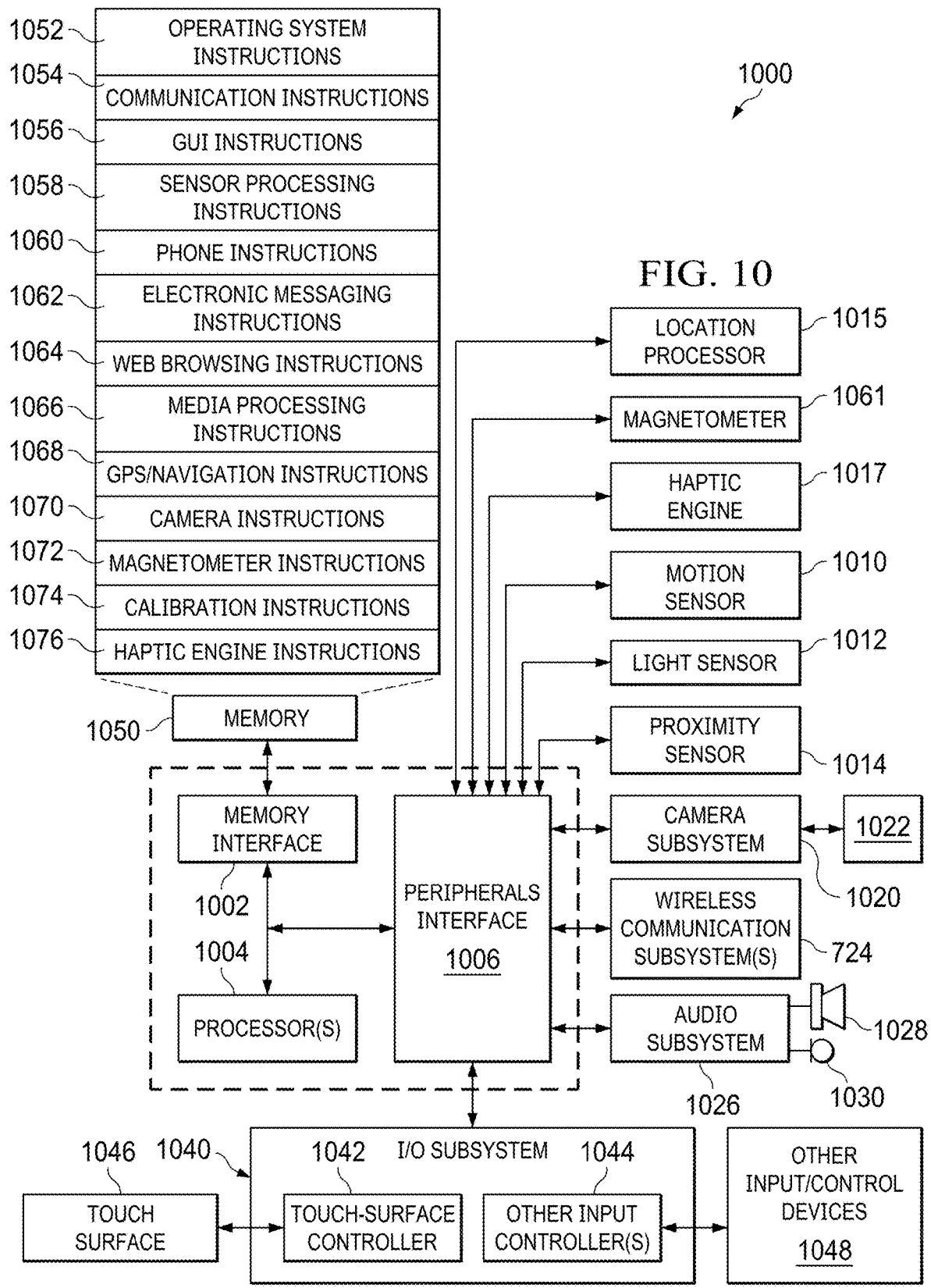

HAPTIC ENGINE HAVING A SINGLE SENSING MAGNET AND MULTIPLE HALL-EFFECT SENSORS

CROSS REFERENCE TO RELATED APPLICATION

This disclosure claims the benefit of the priority of U.S. Provisional Patent Application No. 62/560,130, filed on Sep. 18, 2017. The above-identified application is incorporated herein by reference in its entirety.

BACKGROUND

Technical Field

This specification relates generally to haptic engine architectures, and more specifically, to a haptic engine in which a single sensing magnet carried by the engine's moving mass between two or more Hall-effect sensors provides a varying magnetic field used for sensing the motion of the mass.

Background

A haptic engine (also referred to as a vibration module) is a linear resonant actuator that determines one of acceleration, velocity and displacement of a moving mass. FIG. 11A shows a plan view, e.g., in the (x,y)-plane, and FIG. 11B shows a cross-section view, in the (x,z)-plane, of a conventional haptic engine that has a frame, one or more magnets affixed to the frame, and a mass arranged to move inside the frame. Here, the mass includes a stainless steel or tungsten cage that holds one or more coils corresponding to the static magnets. The mass further includes an array of two or more sensing magnets that are attached to the cage to form, along the x-axis, a row in which adjacent sensing magnets have opposing polarities. The conventional haptic engine further includes a flexible printed circuit (FPC) that holds a pair of Hall-effect sensors, $HES_1$ and $HES_2$, and an application-specific integrated circuit (ASIC) coupled through electrical conductors of the FPC with the $HES_1$ and $HES_2$. In the example illustrated in FIG. 11A, the ASIC is encapsulated in a shield can, and the FPC folds up, out-of-page and parallel to the (x,z) plane. The $HES_1$ and $HES_2$ are (i) spaced apart from the sensing magnets along the z-axis, and (ii) disposed within the magnetic field provided by the array of sensing magnets. As such, a displacement of the mass of the conventional haptic engine, when the mass is vibrated along the x-axis, is encoded in the magnetic field provided by the array of sensing magnets. The $HES_1$ and $HES_2$ output voltage signals $V_{H_1}$ and $V_{H_2}$ to be used by a processor to determine the mass' displacement $\Delta X$ along the x-axis and the mass' displacement $\Delta Z$ along the z-axis as:

$$\Delta X \propto V_{H_1} + V_{H_2} \tag{1},$$

$$\Delta Z \propto V_{H_1} - V_{H_2} \tag{2}.$$

For example, for a separation between $HES_1$ and $HES_2$ of $X_H$ and for a mass range of motion of $\pm X_0$, the requirements that (i) the array of sensing magnets has a size along the x-axis that is at least $4X_0 + 2X_H$, while (ii) the array of sensing magnets must be spaced apart from the static magnets, e.g., by a minimum separation $X_{MS}$, to avoid interaction with the static magnets, can lead to challenging size constraints for the conventional haptic engine. Moreover, the FPC used by the conventional haptic engine tends to have a large area and complicated electrical routing that allows for the $HES_1$ and $HES_2$ to be placed near the array of sensing magnets along the y-axis. All of these considerations lead to increased engine material cost.

Although the conventional haptic engine can sense both the X travel and the Z travel of the mass, yaw modes cannot be reliably sensed unless the sensing magnets are very narrow in the y-axis direction. Using sensing magnets with such an aspect ratio can be a reliability concern especially when the engine is dropped and the moving mass assembly is permanently shifted in the y-axis direction due to plastic deformation of the mechanical flexures. The ability to sense engine modes in the X-Y plane, such as the yaw mode, is critical in engine design because these modes are difficult to damp and is a dominant source of acoustic noise. This is applicable to all resonant actuators with a suspended mass assembly.

SUMMARY

This specification describes technologies for measuring displacement of a mass of a haptic engine by using a sensing geometry in which a single sensing magnet is carried by the mass along a driving direction. Two or more Hall-effect sensors, which are spaced apart (i) from each other along a direction parallel to the driving direction and (ii) from the single sensing magnet along a direction orthogonal to the driving direction, are disposed adjacent to an ASIC that receives the sensors' output.

In general, one innovative aspect of the subject matter described in this specification can be embodied in a haptic engine that includes (a) a frame; (b) a driving system including (i) a first magnet that is coupled with the frame and produces a first magnetic field along a first direction, and (ii) a mass supporting a coil, the mass arranged to be driven relative to the frame along a driving direction orthogonal to the first direction when a driving current is being supplied through the coil; and (c) a sensing system comprising (i) a second magnet that is coupled with the mass and produces a second magnetic field along a second direction orthogonal to the driving direction, and (ii) a first Hall-effect sensor coupled with the frame at a first location of the frame, and a second Hall-effect sensor coupled with the frame at a second location of the frame, the second location being separated from the first location along the driving direction, each of the sensors being spaced apart from the second magnet along the second direction and configured to produce a respective Hall voltage signal corresponding to changes of the second magnetic field at the location of the respective one of the sensors caused when driving the mass.

Other embodiments of this aspect include corresponding displacement measuring systems, and computing devices, each configured to perform the actions performed by the disclosed haptic engine. For a system or a device to be configured to perform particular operations or actions means that the system or the device has installed on it software, firmware, hardware, or a combination of them that in operation cause the system or the device to perform the operations or actions.

The foregoing and other embodiments can each optionally include one or more of the following features, alone or in combination. In particular, one implementation includes all the following features in combination. In some implementations, the second direction can be parallel to the first direction.

In some implementations, the second direction can be orthogonal to the first direction. In some cases, the sensing system can include a third Hall-effect sensor coupled with the frame at a third location of the frame, the third location being between the first and second locations along the driving direction and laterally offset from it; and the third Hall-effect sensor is configured to produce a third Hall voltage signal corresponding to changes of the second magnetic field at the third location caused when driving the mass. In some cases, the sensing system can include (i) a substrate through which the sensors are coupled with the frame, the substrate including conducting lines; and (ii) an ASIC connected to the sensors through the conducting lines to process the respective Hall voltage signals produced by the sensors, the ASIC being disposed on the substrate at a location adjacent to the locations of the sensors. Here, the frame can have (i) an aperture within which the sensors and the ASIC are located, and (ii) a shield can that covers the aperture to shields the sensors and the ASIC from electromagnetic noise from the environment outside the haptic module. In some cases, the sensing system can include (i) a substrate through which the sensors are coupled with the frame, and (ii) a sensor-integrated ASIC disposed on the substrate, the sensor-integrated ASIC including the sensors and being configured to process the respective Hall voltage signals produced by the sensors. Here, the frame can have (i) an aperture within which the sensor-integrated ASIC is located, and (ii) a shield plate that covers the aperture to shields the sensor-integrated ASIC from electromagnetic noise from the environment outside the haptic module. In some cases, the mass can be shaped like a cage, and the second magnet is coupled with the mass (i) on a side surface of the cage that is parallel to the driving direction and orthogonal to the second direction, and (ii) adjacent to a corner of the cage that is nearest the first and second locations of the frame.

In some implementations, a gradient of the second magnetic field along the driving direction has a maximum positive value at the first location and a maximum negative value at the second location. In some implementations, the mass can be driven along the driving direction over a distance that is smaller than or equal to the separation between the first and second locations, and when the mass is at rest relative to the frame, the second magnet is equally spaced, along the driving direction, from the first Hall-effect sensor and the second Hall-effect sensor.

In some implementations, a displacement measurement system can include the above-noted haptic engine, and a digital signal processor configured to determine tangential displacements of the mass along the driving direction based on the Hall voltage signals produced by the Hall-effect sensors. In some cases, the digital signal processor can be configured to cause supplying, based on the determined tangential displacements, the driving current through the coil. In some cases, the digital signal processor can be configured to (i) obtain, while operating the haptic engine at an operational driving frequency, a difference signal as the difference between the Hall voltage signals, and (ii) use the difference signal for determining the tangential displacements.

In some cases, the digital signal processor can be configured to (i) detect modes of the mass' motion along the second direction, and (ii) cause suppressing of the detected modes. For example, the digital signal processor can be configured to (i) obtain, while operating the haptic engine at an operational driving frequency smaller than a maximum operational frequency, a sum signal as the sum of the Hall voltage signals, (ii) obtain a spectrum of the sum signal, and (iii) use the spectrum of the sum signal for detecting the modes of the mass' motion along the second direction. Here, the digital signal processor can be configured to use for the detecting only a portion of the spectrum that is over frequencies larger than the maximum operational frequency. Also here, the digital signal processor can be configured to (i) access, in a data store, predetermined frequencies corresponding to the modes of the mass' motion along the second direction for the haptic engine, (ii) determine whether the spectrum of the sum signal has spectral features at one or more frequencies that match respective ones of the predetermined frequencies, and if so (iii) identify each detected mode based on its matching predetermined frequency. For example, the digital signal processor can be configured to (i) obtain respective sum signals for multiple driving frequencies lower than the maximum operational frequency, (ii) obtain a spectrum for each respective sum signal, (iii) identify, using portions of the spectra that are over frequencies larger than the maximum operational frequency, one or more frequencies of spectral features corresponding to respective modes of the mass' motion along the second direction, and (iv) store the identified frequencies as the predetermined frequencies for the haptic engine.

In some implementations, a computing system can include the above-noted displacement system. For instance, the computing system can be one of a smartphone, a tablet, a laptop and a watch.

Another innovative aspect of the subject matter described in this specification can be embodied in a device that includes (a) a haptic interface; (b) a haptic engine coupled with the haptic interface, the haptic engine including (i) a frame; (ii) a first magnet that is coupled with the frame and produces a first magnetic field along a first direction, (iii) a mass supporting a coil, the mass arranged to be driven relative to the frame along a driving direction orthogonal to the first direction when a driving current is being supplied through the coil, (iv) a second magnet that is coupled with the mass and produces a second magnetic field along a second direction orthogonal to the driving direction, and (v) a first magnetic field sensor coupled with the frame at a first location of the frame, and a second magnetic field sensor coupled with the frame at a second location of the frame, the second location being separated from the first location along the driving direction, each of the sensors being spaced apart from the second magnet along the second direction and configured to produce a respective sensor signal corresponding to changes of the second magnetic field at the location of the respective one of the sensors caused when driving the mass; and (c) a digital signal processor communicatively coupled with the haptic engine, the digital signal processor configured to determine tangential displacements of the mass along the driving direction based on the sensor signals produced by the magnetic field sensors.

Implementations can include one or more of the following features. In some implementations, the above-noted device can include a driver module coupled with the digital signal processor and the haptic engine, the driver module configured to supply, based on the determined tangential displacements, the driving current through the coil. In some implementations, the above-noted device can be a smartphone, a tablet, a laptop and a watch. In some implementations, the magnetic field sensors can be Hall-effect sensors.

In some implementations, the second direction can be parallel to the first direction. In some implementations, the second direction can be orthogonal to the first direction. Here, the mass can be shaped like a cage, and the second magnet is coupled with the mass (i) on a side surface of the cage that is parallel to the driving direction and orthogonal to the second direction, and (ii) adjacent to a corner of the cage that is nearest the first and second locations of the frame.

The subject matter described in this specification can be implemented in particular embodiments so as to realize one or more of the following advantages. For example, the area of the FPC used to implement the disclosed technologies can be significantly reduced relative to the FPC used to implement the above-noted conventional haptic engine. As such, reductions in the FPC's cost, and improvements in the FPC's manufacturability also are possible.

As another example, the disclosed technologies enable that yaw, Y, and Z modes can be sensed, in addition to the X mode. This is possible because of the arrangement of the single sensing magnet ensures the Hall-effect sensors always experience non-zero sensing-flux produced by the single sensing magnet. Any sensing-flux variation caused by non-X mode motion can therefore be decoupled and sensed. As the disclosed haptic engine can detect unwanted yaw modes, it can be configured to proactively damp the yaw modes by using active electronic damping of the unwanted modes. Additionally, the sensing magnet can be disposed closer to the static magnets of the haptic engine without compromising the sensitivity of the displacement measurements performed by the haptic engine, because the sensing magnetic field oriented in the (x,y) plane does not couple with the driving magnetic field provided by the static magnets in a plane (x,z) perpendicular to the plane of motion (x,y). The closer proximity between the sensing magnet and the static magnets allows for reductions in the size of the haptic engine.

As yet another example, due to the Hall sensor placement relative to the geometry of the disclosed haptic engine, the sensing magnet is small compared to maximum X travel. This is in contrast with the conventional haptic engine in which the array of sensing magnets is extended over the entire maximum X travel. As yet another example, the Hall sensors are placed adjacent to the controlling ASIC. The Hall sensors' close proximity to the ASIC improves routing and signal integrity. It also gives an opportunity to integrate the Hall sensors into future designs of the ASIC itself.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 1A-1B show aspects of a first example of a haptic engine.

FIGS. 2A-2B show aspects of a second example of a haptic engine.

FIG. 7 shows a process for identifying unwanted vibration modes induced in a haptic engine like the ones shown in FIGS. 1A-1B and FIGS. 2A-2B and for damping the identified modes.

FIG. 10 an example mobile device architecture that uses a haptic engine as the ones described in reference to FIG. 1-9, according to an embodiment.

Like reference numbers and designations in the various drawings indicate like elements.

DETAILED DESCRIPTION

Figure 1B:
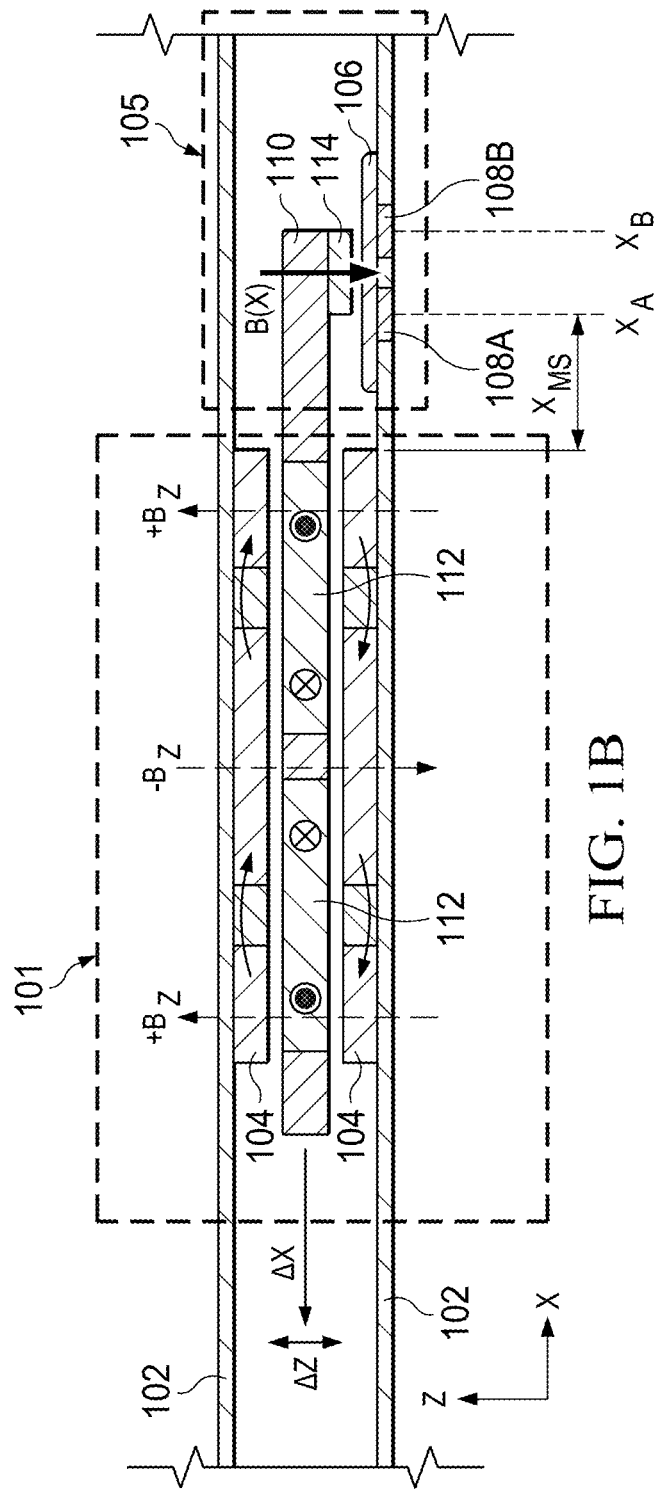

FIG. 1A is a plan view, e.g., in the (x,y)-plane, and FIG. 1B is a cross-section view, in the (x,z)-plane, of an example of a haptic engine 100 that includes a sensing system 105 with a single sensing magnet 114 and a pair of Hall-effect sensors 108A, 108B. The haptic engine 100 has a frame 102 and further includes a driving system 101 and a mass 110 that are enclosed inside the frame.

The driving system 101 includes a stationary part and a moving part. In the example illustrated in FIGS. 1A-1B, the moving part includes a pair of coils 112, each of which being formed from a winding parallel to the (x,y)-plane. Moreover, the mass 110 is implemented as a cage (e.g., made from steel or tungsten) having enclosures configured to hold the coils 112. In the example illustrated in FIG. 1A, the cage is constrained to move along the driving direction by using flexures 109A, 109B. In this manner, the moving part of the driving system 101 will be carried by the mass 110, e.g., when the mass is driven along a driving direction, here the x-axis. The stationary part of the driving system 101 includes a pair of magnetic plates 104 affixed to the opposing side surfaces of the frame 102 that are parallel to the (x,y)-plane. As such, the cage is sandwiched along the z-axis by the magnetic plates 104. Each of the magnetic plates 104 is formed from magnetic tiles that are distributed across the (x,y)-plane to produce, inside the cage, a magnetic field $B_Z$ oriented along the z-axis, orthogonal to the driving direction. More specifically, for each coil held by the cage, the magnetic plates 104 produce the magnetic field $B_Z$ that is parallel to the z-axis over a half of the coil winding, and anti-parallel to the z-axis over the other half of the coil winding. A power source (not shown in FIGS. 1A-1B) supplies to the coils 112 currents having opposite circulations. For instance, when a counter-clockwise current is supplied to one of the coils 112, a clockwise current is supplied to the other one of the coils. As such, for the configuration of the magnetic field $B_Z$ produced by the magnetic plates 104 and at a time instance when the current circulation in the coils 112 is as illustrated in FIG. 1B, the coils experience a Lorentz force anti-parallel to the x-axis (i.e., to the left of the page) and will move, along with the mass 110, in that direction. In this manner, as the power source supplies alternating currents of opposite circulations to the coils 112, a periodic Lorentz force will drive, along the x-axis, the mass 110, which includes the coils. An amplitude and a frequency of the displacement ΔX of the mass 110 along the driving direction depend from the amplitude and the frequency of the alternating currents supplied to the coils 112.

In the example illustrated in FIGS. 1A-1B, the sensing system 105 includes a flexible printed circuit (FPC) 106 that is affixed to one of the side surfaces of the frame 102 parallel to the (x,y)-plane. The Hall-effect sensors 108A, 108B are mounted on the FPC 106 at locations $X_A$, $X_B$ that are separated from each other, along the x-axis, by a separation of the order of a maximum X travel. Here, the maximum X travel is the maximum distance $2X_0$ that the mass 110 is expected to travel when driven by the driving system 101 between coordinates $\pm X_0$ along the x-axis. The sensing system 105 further includes an ASIC 122 mounted on the FPC 106 and electrically coupled with the Hall-effect sensors 108A, 108B through conducting lines of the FPC. In the example illustrated in FIG. 1A, the FPC 106 extends through a slot 103 of the frame 102. Here, the portion of the FPC 106 that is outside of the frame 102 folds along a side surface of the frame that is parallel to the (x,z)-plane. Moreover, a ferretic shield can 124 encompasses the slot 103 and the ASIC 122 to shield the interior of the frame 102 and the ASIC from electromagnetic noise and magnetic coupling from the environment outside the haptic module 100.

The sensing magnet 114 of the sensing system 105 is affixed to one of the side surfaces of the mass 110 parallel to the (x,y)-plane that faces the Hall-effect sensors 108A, 108B. As the mass 110 is implemented as a cage, the sensing magnet 114 can be held in an enclosure of the cage or in a recess of the side surface of the cage, or can be attached on the cage's side surface itself. In this manner, the sensing magnet 114 of the sensing system 105 illustrated in FIGS. 1A-1B produces a sensing magnetic field B oriented along the z-axis, i.e., along a direction that is orthogonal to the driving direction and parallel to the direction of the magnetic field $B_Z$ produced by the stationary part of the driving system 101. A profile B(X) along the x-axis of the sensing magnetic field B corresponds to the profile of a single magnet, as described below in connection with FIGS. 6A-6B. Moreover, when the mass 110 is at rest, the sensing magnet 114's location is equally spaced, along the driving direction, here the x-axis, from the locations $X_A$, $X_B$ of the Hall-effect sensors 108A, 108B. As the mass 110 is being driven by the driving system 101 along the x-axis, the Hall-effect sensors 108A, 108B will sense changes in the sensing magnetic field B produced by the sensing magnet 114 as the sensing magnet is being carried by the mass. Hall voltage signals $V_{H_1}$, $V_{H_2}$, that are output by the Hall-effect sensors 108A, 108B in response to the changes in the sensing magnetic field B, are provided by the haptic engine 100 to a digital signal processor to (i) determine the displacement $\Delta X$ of the mass 110, and (ii) detect the mass' unwanted displacements $\Delta Z$, $\Delta Y$ and $\Delta \Phi$, as described below in connection with FIGS. 6A-6B.

Figure 1C:
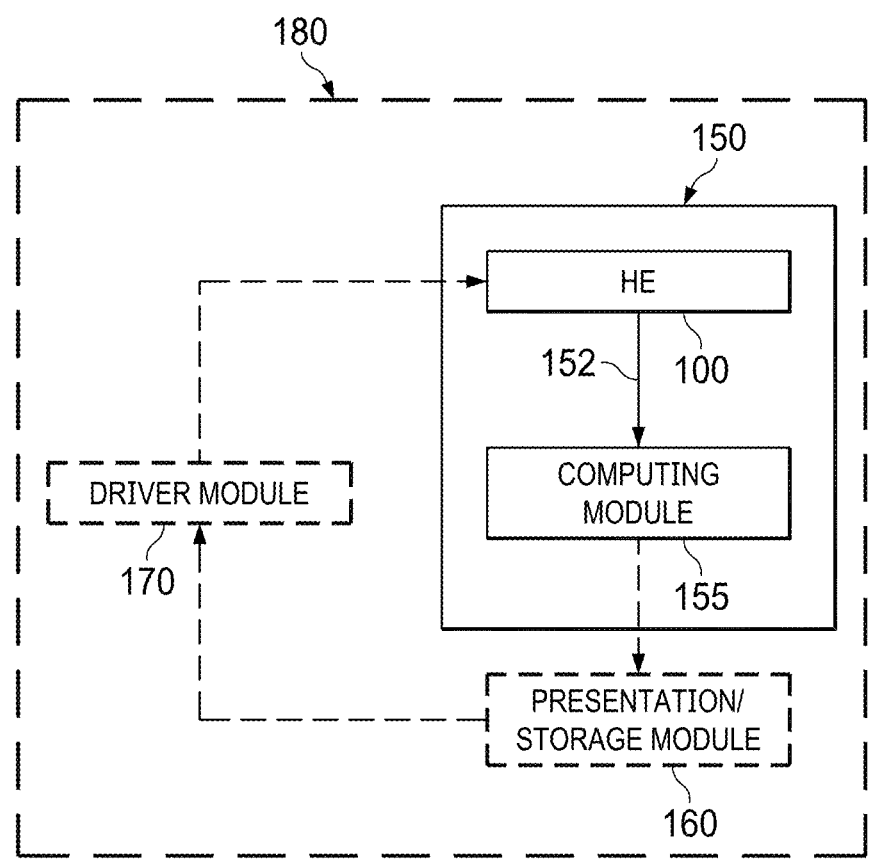
FIG. 1C shows an example of a displacement measurement system that includes a haptic engine.

FIG. 1C shows a displacement measurement system 150 that includes the haptic engine 100 and a computing module 155 coupled to the haptic engine through a sensing channel 152. The computing module 155 includes the above-noted digital signal processor, which uses the Hall voltage signals $V_{H_1}$, $V_{H_2}$ output by the Hall-effect sensors 108A, 108B, to (i) determine the displacement $\Delta X$ of the mass 110, and (ii) detect the mass' unwanted displacements $\Delta Z$, $\Delta Y$ and $\Delta \Phi$. In some implementations, when the computing module 155 receives the Hall voltage signals $V_{H_1}$, $V_{H_2}$ as analog signals, the computing module includes analog-to-digital converters (ADCs) to digitize the received analog signals, so the digital signal processor uses the digitized Hall voltage signals $V_{H_1}$, $V_{H_2}$ for calculating the mass displacement(s). In other implementations, the ASIC 122 of the haptic engine 100 digitizes the Hall voltage signals $V_{H_1}$, $V_{H_2}$ prior to transmitting them to the computing module 155 over the sensing channel. In this manner, the calculated mass displacements $\Delta X$ and/or the detected mass' unwanted displacements $\Delta Z$, $\Delta Y$ and $\Delta \Phi$ can be provided by the displacement measurement system 150 to a driver module 170, which in turn suitably uses the provided information to control the driving system 101 of the haptic engine 100. Alternatively or additionally, the mass displacements $\Delta X$ and/or the mass' unwanted displacements $\Delta Z$, $\Delta Y$ and $\Delta \Phi$ can be provided by the displacement measurement system 150 for display or storage to a presentation/storage module 160. Moreover, the displacement measurement system 150 can be integrated in a computing device 180, e.g., in a smartphone, tablet, watch or any other electronic device that uses an LRA module for haptic feedback, either by itself or along with one or both of the driver module 170 and the presentation/storage module 160.

Referring again to FIGS. 1A-1B, note that as the sensing magnetic field B is parallel to the magnetic field $B_Z$ produced by the static magnetic plates 104, the magnetic fields B and $B_Z$ will interact and their interaction causes mechanical motion along the z-axis, which in turn can produce undesirable acoustic noise. This motion can be stronger for cases when the separation $X_A-X_B$ is comparable to a distance $X_{MS}$ (between the static magnetic plates 104 and the Hall-effect sensors) then for cases when the distance $X_{MS}$ is large compared to the separation $X_A-X_B$. Instead of increasing the distance $X_{MS}$ to reduce the interaction between the parallel magnetic fields B and $B_Z$, a new geometry of the haptic engine is described below, in which the magnetic fields B and $B_Z$ are orthogonal, so their interaction can be substantially eliminated, for any distance $X_{MS}$. Such a geometry of the haptic engine, that enables further miniaturization thereof, is described below in connection with FIGS. 2A-2B.

FIG. 2A is a plan view, e.g., in the (x,y)-plane, of another example of a haptic engine 200 that includes a sensing system 205 with a single sensing magnet 214 and a pair of Hall-effect sensors 208A, 208B. Note that the haptic engine 200 can be used in the displacement measurement system 150 in conjunction with, or instead of, the haptic engine 100. The haptic engine 200 has a frame 202 and further includes a driving system 201 and a mass 210 that are enclosed inside the frame. The driving system 201 is implemented, and therefor functions, as the driving system 101 described above in connection with FIGS. 1A-1B. For example, the coils 212 of the moving part of the driving system 201 correspond to the coils 112 of the moving part of the driving system 101. The mass 210 is implemented as a cage that holds the coils 212 and carries them when the mass is driven along a driving direction, here the x-axis, as described for the mass 110 and the corresponding components of the driving system 101. Here, the cage is constrained to move along the driving direction by using flexures 209A, 209B. Although not shown in FIG. 2A, the stationary part of the driving system 201 is implemented, and therefore functions, as the stationary part of the driving system 101 described above in connection with FIGS. 1A-1B. As such, the stationary part of the driving system 201 produces, inside the cage, a magnetic field $B_Z$ oriented along the z-axis (out of page), orthogonal to the driving direction. In this manner, as a power source (not shown in FIG. 2A) supplies alternating currents of opposite circulations to the coils 212, a periodic Lorentz force will drive, along the x-axis, the mass 210, which includes the coils.

Figure 2B:
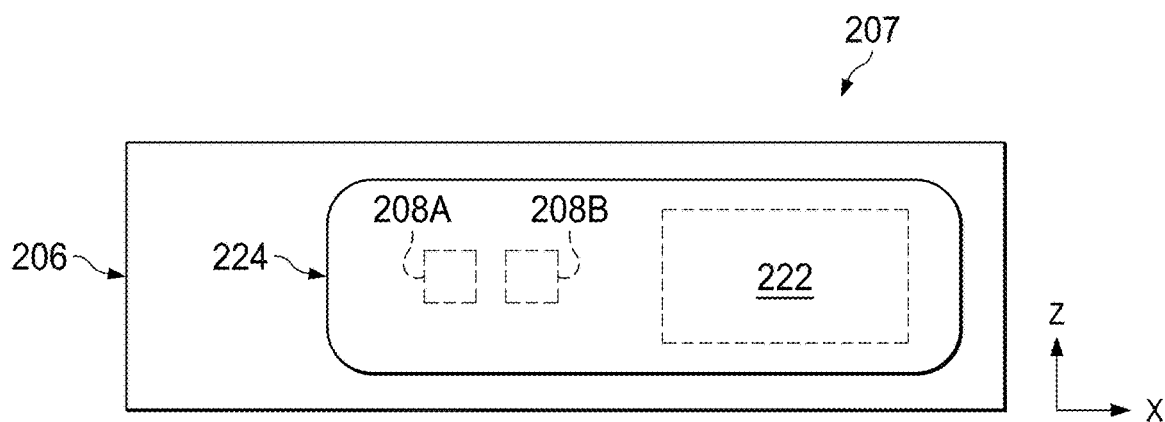

In the example illustrated in FIG. 2A, the sensing system 205 includes an FPC 206 that is affixed to one of the side surfaces of the frame 202 parallel to the (x,z)-plane. The Hall-effect sensors 208A, 208B are mounted on the FPC 206 at locations $X_A$, $X_B$ that are separated from each other, along the x-axis, by a separation of the order of a maximum X travel $2X_0$. The sensing system 205 further includes an ASIC 222 mounted on the FPC 206 and electrically coupled with the Hall-effect sensors 208A, 208B through conducting lines of the FPC. In the example illustrated in FIG. 2A, the FPC 206 is disposed outside of the frame 202, and the locations $X_A$, $X_B$ of the Hall-effect sensors 208A, 208B are within a slot 203 of the frame. As further illustrated in FIG. 2B, the locations $X_A$, $X_B$ of the Hall-effect sensors 208A, 208B are adjacent to a location of the ASIC 222 on the FPC 206. This allows for a transducer sub-system 207, which includes the Hall-effect sensors 208A, 208B and the ASIC 222, to be more compact than a corresponding transducer sub-system of the sensing system 105. Note that for the transducer sub-system of the sensing system 105, the ASIC 122 is not disposed adjacent to the Hall-effect sensors 108A, 108B. Accordingly, routing and signal integrity will be increased for the transducer sub-system 207 relative to the corresponding to corresponding transducer sub-system of the sensing system 105. Moreover, a shield can 224 encompasses the slot 203 and the transducer sub-system 207 to shield the interior of the frame 202 and the components of the transducer sub-system from electromagnetic noise and magnetic coupling from the environment outside the haptic module 200.

Referring again to FIG. 2A, the sensing magnet 214 of the sensing system 205 is affixed to one of the side surfaces of the mass 210 parallel to the (x,z)-plane that faces the Hall-effect sensors 208A, 208B through the slot 203. As the mass 210 is implemented as a cage, the sensing magnet 214 can be held in an enclosure of the cage or in a recess of the side surface of the cage, or can be attached on the cage's side surface itself. In this manner, the sensing magnet 214 of the sensing system 205 illustrated in FIG. 2A produces a sensing magnetic field B oriented along the y-axis, i.e., along a direction that is orthogonal to the driving direction and orthogonal to the direction of the magnetic field $B_Z$ produced by the stationary part of the driving system 201. A profile B(X) along the x-axis of the sensing magnetic field B corresponds to the profile of a single magnet, as described below in connection with FIGS. 6A-6B. Moreover, when the mass 210 is at rest, the sensing magnet 214's location is equally spaced, along the driving direction, here the x-axis, from the locations $X_A$, $X_B$ of the Hall-effect sensors 208A, 208B. As the mass 210 is being driven by the driving system 201 along the x-axis, the Hall-effect sensors 208A, 208B will sense changes in the sensing magnetic field B produced by the sensing magnet 214 as the sensing magnet is being carried by the mass. Hall voltage signals $V_{H_1}$, $V_{H_2}$, that are output by the Hall-effect sensors 208A, 208B in response to the changes in the sensing magnetic field B, are provided by the haptic engine 200 to a digital processor (e.g., of the computing module 155) to (i) determine the displacement $\Delta X$ of the mass 210, and (ii) detect the mass' unwanted displacements $\Delta Z$, $\Delta Y$ and $\Delta \Phi$, as described below in connection with FIGS. 6A-6B.

Note that as the sensing magnetic field B is orthogonal to the magnetic field $B_Z$ produced by the stationary part of the driving system 201, the magnetic fields B and $B_Z$ will not interact, or will do so only minimally. Accordingly, the Hall voltage signals $V_{H_1}$, $V_{H_2}$ output by the Hall-effect sensors 208A, 208B will be less noisy than the ones output by the Hall-effect sensors 108A, 108B of the sensing system 105.

Figure 3A:
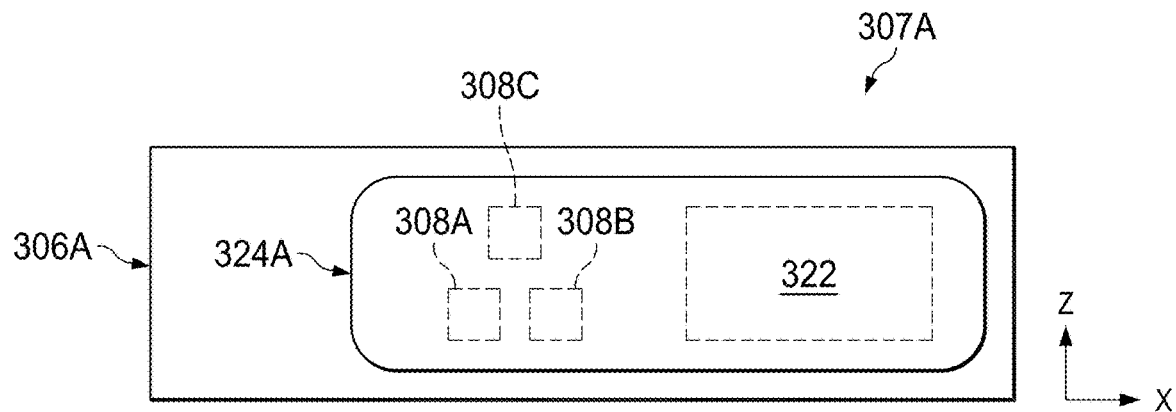
FIGS. 3A-3B, 4 and 5 show respective examples of a transducer sub-system that can be used to replace the transducer system of the haptic engine shown in FIG. 2A.
Figure 3B:
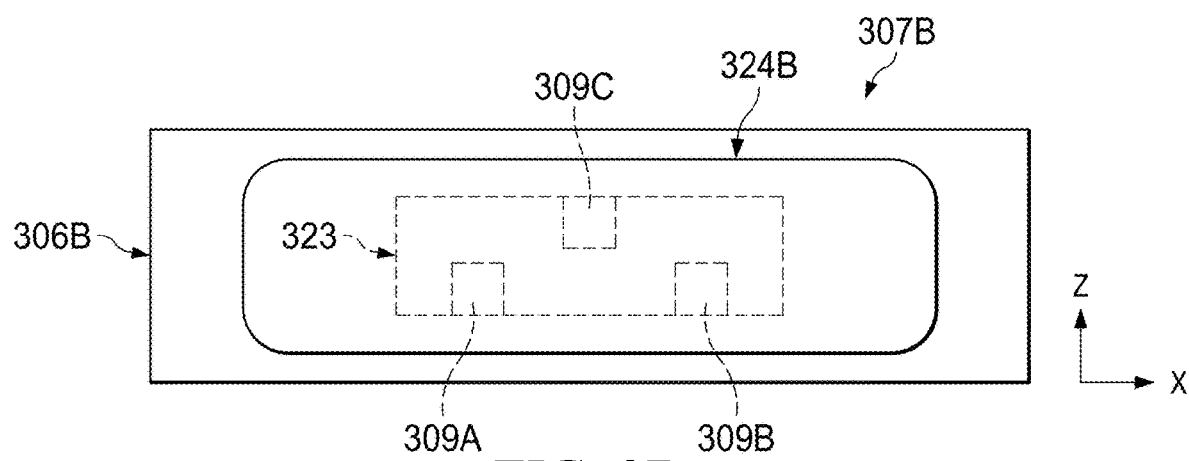

In some implementations, displacements of the mass of a haptic engine along a direction orthogonal to the driving direction, e.g., the displacements $\Delta Y$ of mass 110 along the y-axis or the displacements $\Delta Z$ of the mass 210 along the z-axis, can be determined simultaneously to the determining of displacements along the driving direction, e.g., the displacements $\Delta X$ along the x-axis, by adding one or more additional Hall-effect sensors to the sensing system of the haptic engine, as described below in connection with FIGS. 3A-3B.

FIG. 3A is a plan view, e.g., in the (x,z)-plane, of an example of a transducer sub-system 307A, and FIG. 3B is a plan view, e.g., in the (x,z)-plane, of another example of a transducer sub-system 307B, either of which can replace the transducer sub-system 207 of the haptic system 200 to simultaneously sense Z modes in addition to X, Y and/or $\Phi$ modes. FIG. 3A shows that the transducer sub-system 307A includes an FPC 306A, Hall-effect sensors 308A, 308B, 308C and an ASIC 322 mounted on the FPC. The Hall-effect sensors 308A, 308B, 308C are located on the FPC 306A to have spatial separation along the z-axis, such that 308C is offset along the z-axis from a line parallel to the x-axis along which 308A, 308B are located. Note that when the mass 210 is at rest, the sensing magnet 214's location coincides with the center of the smallest rectangle that bounds the Hall-effect sensors 308A, 308B, 308C. The ASIC 322 is disposed at a location adjacent to the locations of 308A, 308B, 308C on the FPC 306 making the transducer sub-system 307A compact within the (x,z)-plane. A shield can 324A is used to shield the components of the transducer sub-system 307A from electromagnetic noise and magnetic coupling from the environment outside the haptic module 200.

The compact arrangement of the transducer sub-system 307A can be made even more compact in the (x,z)-plane, as exemplified by the transducer sub-system 307B. FIG. 3B shows that the transducer sub-system 307B includes an ASIC 323 with CMOS integrated Hall-effect sensors 309A, 309B, 309C, and an FPC 306B onto which the ASIC has been mounted. The spatial arrangement of the CMOS integrated Hall-effect sensors 309A, 309B, 309C on the ASIC 323 is similar to, but smaller in area than, the spatial arrangement of the Hall-effect sensors 308A, 308B, 308C of the transducer sub-system 307A. Also, when the mass 210 is at rest, the sensing magnet 214's location coincides with the center of the smallest rectangle that bounds the Hall-effect sensors 309A, 309B, 309C on the ASIC 323. A shield can 324B, that has a smaller extent in the (x,z)-plane than the shield can 324A, is used to shield the components of the transducer sub-system 307B from electromagnetic noise from the environment outside the haptic module 200.

Figure 4:
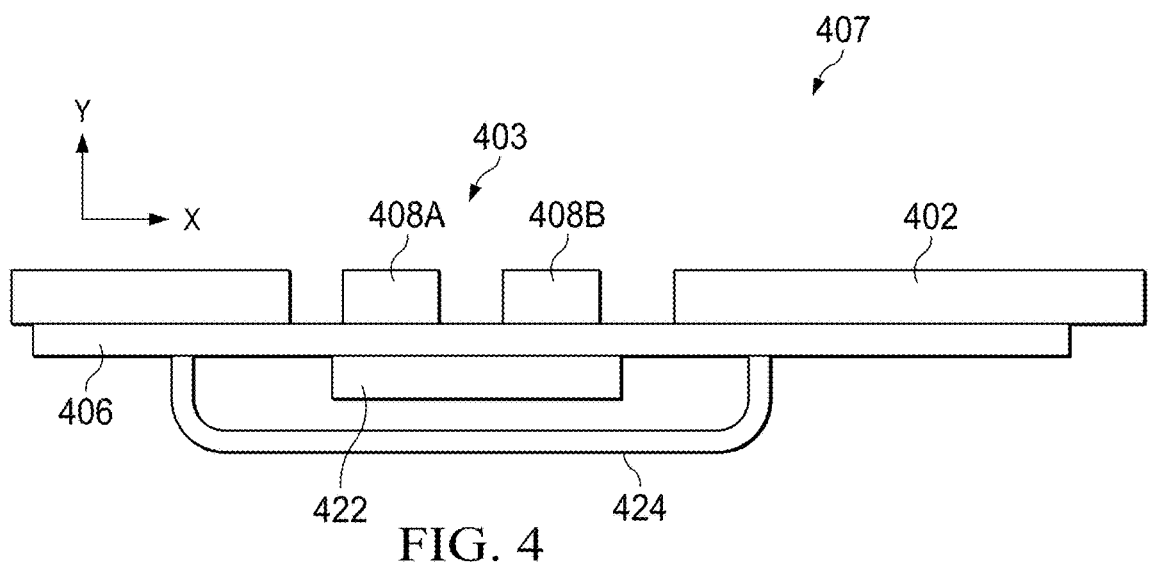

Referring again to FIGS. 2A-2B, note that the Hall-effect sensors 208A, 208B of the transducer sub-system 207 are mounted adjacent to the ASIC 222 on the FPC 206. In FIG. 4, another example of a transducer sub-system 407 includes an FPC 406, Hall-effect sensors 408A, 408B mounted on the FPC within the slot 403 of the frame 402, and an ASIC 422 mounted on the opposing side of the FPC from the sensors. In this manner, the transducer sub-system 407 is more compact in the (x,z)-plane than the transducer sub-system 207. Also, a shield can 424, that has a smaller extent in the (x,z)-plane than the shield can 224, is used to shield the components of the transducer sub-system 407 from electromagnetic noise from the environment outside the haptic module 200.

Figure 5:
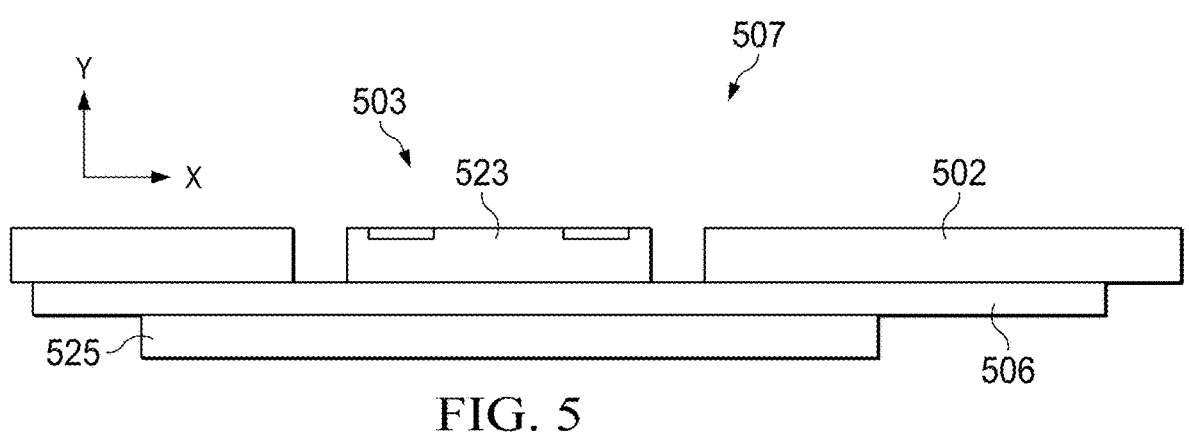

Note that the transducer sub-system 407 protrudes, along the y-axis, from the frame 202 of the haptic engine 200 (because the ASIC 422, which is mounted on the side of the FPC 406 opposing the slot 403, has a finite thickness), and is covered by the shield can 424 that has a finite height along the y-axis (so it can encompass the ASIC). The shield can 424 could be replace with a flat shield plate if the ASIC were mounted on the same side with the sensors. In order to keep the transducer sub-system compact in the (x,z)-plane and remove the shield can, another example of transducer subsystem 507 is proposed, as shown in FIG. 5. In FIG. 5, the transducer sub-system 407 includes an ASIC 523 with CMOS integrated Hall-effect sensors, and an FPC 506 onto which the ASIC has been mounted. In this manner, the transducer sub-system 507 is about as compact in the (x,z)-plane as the transducer sub-system 407. However, the transducer sub-system 507 uses a flat shield plate 525, which has a protrusion along the y-axis from the frame 506 that is smaller than the height of any of the previously described shield cans. The shield plate 525 shields the components of the transducer sub-system 507 from electromagnetic noise and magnetic coupling from the environment outside the haptic module 200. In this manner, when the example of transducer sub-system 507 is used in conjunction with the haptic engine 200, the frame 202 can have matchbox shape, as the height of the shield has been reduced to substantially zero.

Figure 6A:
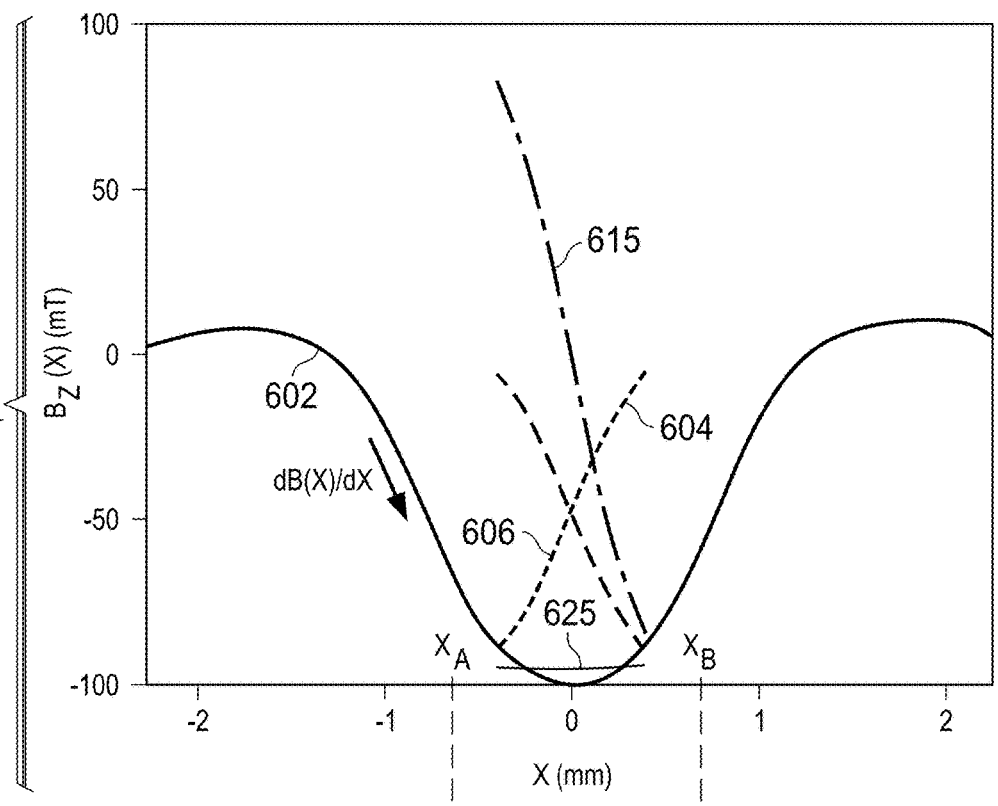
FIGS. 6A-6B show aspects of a sensing system that can be used in either of the haptic engines shown in FIGS. 1A-1B and FIGS. 2A-2B.
Figure 6B:
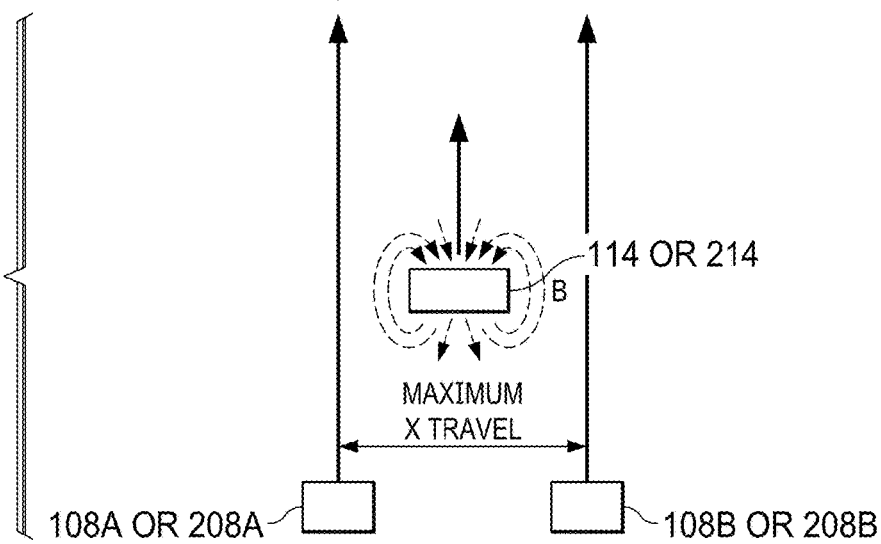

FIG. 6A and FIG. 6B show aspects of a sensing magnetic field B produced by a sensing magnet (114; 214) that is used in conjunction with a pair of Hall-effect sensors (108A, 108B; 208A, 208B) in a sensing system (105; 205) of a haptic engine (100; 200). FIG. 6B shows that the sensing magnet (114, 214) is spaced apart, along the z-axis, from the Hall-effect sensors (108A, 108B; 208A, 208B), and produces the sensing magnetic field B having field lines characteristic to a single magnet polarized along the z-axis. The first Hall-effect sensor (108A; 208A) is located at $X_A$, and the second Hall-effect sensor (108B; 208B) is located at $X_B$. Here, the sensor locations $X_A$, $X_B$ are fixed relative to a frame (102; 202) of the haptic engine (100; 200), and are equally spaced from X=0. The sensing magnet (114; 214) is attached to a mass (110; 210) of the haptic engine (100; 200). When the mass (110; 210) is not being driven, the sensing magnet (114; 214) is at rest relative to the frame (102; 202) at X=0. The maximum X travel of the sensing magnet (114, 214) is defined by the center-to-center distance between the Hall-effect sensors 208A and 208B.

FIG. 6A shows a profile B(X) 602 along the x-axis (blue curve) of the sensing field B, when the sensing magnet (114; 214) is located at X=0. Note that the sensing magnet 214 is sized to provide best sensitivity, e.g., to produce a gradient dB/dX of BZ(X) 602 that has largest magnitude, at each of the sites $X_A$, $X_B$ of the Hall-effect sensors (108A, 108B; 208A, 208B). Note that the representation of the profile B(X) 602 will be shifted left-and-right, in FIG. 6A, as the mass (110; 210) of the haptic engine (100; 200), which carries the sensing magnet (114; 214), is driven left-and-right along the x-axis.

FIG. 6A further shows a first Hall-voltage signal $V_{H_1}$ 604 output by the first Hall-effect sensor (108A; 208A) located at $X_A$, and a second Hall-voltage signal $V_{H_2}$ 606 output by the second Hall-effect sensor (108B; 208B) located at $X_B$, when the sensing magnet (114; 214) moves left-and-right along with the driven mass (110; 210). Note that the first Hall-voltage signal $V_{H_1}$ 604 has a maximum value and the second Hall-voltage signal $V_{H_2}$ 606 has a minimum value when the sensing magnet (114; 214) is above the second Hall-effect sensor (108B; 208B); and the first Hall-voltage signal $V_{H_1}$ 604 has a minimum value and the second Hall-voltage signal $V_{H_2}$ 606 has a maximum value when the sensing magnet (114; 214) is above the first Hall-effect sensor (108A; 208A).

The sensing system (105, 205) senses the X travel of the mass (110; 210) using a difference signal 615 shown in FIG. 6A as the difference between the first Hall-voltage signal $V_{H_1}$ 604 and the second Hall-voltage signal $V_{H_2}$ 606. By using the difference signal 615, which has a slope steeper than the slope of each of the individual Hall-voltage signals 604, 606, the size along the x-axis of the single sensing magnet (114; 214) can be reduced relative to the size of the array of sensing magnets of the conventional haptic engine. That allows for a smaller separation between the Hall-effect sensors (108A, 108B; 208A, 208B) to the magnetic plates (104) of the haptic engine (100, 200). As such, for the same distance between the Hall-effect sensors (108A, 108B; 208A, 208B) and the magnetic plates (104) of the haptic engine (100, 200), the sensing magnet (114; 214) is further away from the magnetic plates (104) compared to that of the conventional haptic engine. Thus, the interaction between the magnetic plates and the sensing magnet (114; 214) can be beneficially reduced compared to that of the conventional haptic engine because the sensing magnet now vibrates at an effectively large distance along the x-axis relative to the magnetic plates.

Note that, concurrently to sensing the X travel of the mass (110; 210) based on the difference signal 615, the sum signal 625 of the first Hall-voltage signal $V_{H_1}$ 604 and the second Hall-voltage signal $V_{H_2}$ 606 can be used to sense travel of the mass along a direction parallel to the separation between a plane of the X travel (in which the motion of the sensing magnet (114; 214) takes place) and the sensing plane (that includes the Hall-effect sensors (108A, 108B; 208A, 208B)). With reference to FIGS. 6A and 1A-1B, for the haptic engine 100, in which the plane of the X travel and the sensing plane are spaced apart along the z-axis, the sum signal 625 can be used to sense Z travel of the mass 110. Here, the sum signal 625 increases (decreases) when the mass 110 carrying the sensing magnet 114 moves along the z-axis closer to (farther from) the Hall-effect sensors 108A and 108B.

In some implementations of the haptic engine 100, the motion of its mass 110 along the z-axis can be constrained by using a lubricant, e.g., a ferrous liquid/oil. However, unwanted translations ΔY and/or unwanted yaw, i.e., rotations ΔΦ about the z-axis, of the mass 110 cannot be prevented by the lubricant. As such, it is beneficial to sense the unwanted in-plane motion ΔY and ΔΦ of the mass 110, and then apply corrective procedures to suppress them. Note that the sum signal 625 can also be used to sense Y travel and/or yaw motion of the mass 110. That is because the sum signal 625 also decreases (increases) when the mass 110 carrying the sensing magnet 114 moves along the y-axis away from (back towards) the Hall-effect sensors 108A and 108B.

Referring now to FIGS. 6A and 2A, for the haptic engine 200, in which the plane of the X travel and the sensing plane are spaced apart along the y-axis, the sum signal 625 can be used to sense Y travel and/or yaw motion of the mass 210. Here, the sum signal 225 increases (decreases) when the mass 210 carrying the sensing magnet 214 moves along the y-axis closer to (farther from) the Hall-effect sensors 208A and 208B. Note that for the haptic engine 200, the sensing system 205 (that includes the sensing magnet 214 and the Hall-effect sensors 208A and 208B) can be positioned along the x-axis anywhere relative to a corner of the mass 210. However, the amplitude of the yaw modes will increase (decrease) by placing the sensing system 205 closer to a corner (the middle) of the mass 210.

Further note that it has been determined experimentally, for both haptic engines 100, 200, that it is possible to tell apart whether the changes in the sum signal 625 are due to Z modes, Y modes or yaw modes of the mass (110; 210)'s motion because they occur at different vibration frequency ranges, e.g., $320 < f_Z < 343$ Hz, $353 < f_Y < 450$ Hz, and $513 < f_{YAW} < 523$ Hz, respectively, for the particular design that has been studied here. Experimental results for detecting the frequencies $f_Z$, $f_Y$ and $f_{YAW}$ are presented below in connection with FIGS. 8A-8D. For other designs, these frequency ranges can be determined from finite element analysis simulation or factory calibration.

Referring again to FIG. 6A, note that prior to (i) determining the displacement $\Delta X$ of the mass (110; 210) of the haptic engine (100; 200) along the driving direction based on the difference signal 615, and/or (ii) performing spectral analysis of the sum signal 625 to detect whether unwanted modes have been induced in the motion of the mass, a digital signal processor is used to apply a set of corrections to the Hall voltage signals $V_{H_1}$, $V_{H_2}$, that are output by the Hall-effect sensors (108A, 108B; 208A, 208B). In some implementations, a digital signal processor is integrated in the ASIC (122; 222) of the sensing system (105; 205) of the haptic engine (100; 200). In some implementations, the ASIC (122; 222) that is part of the sensing system (105; 205) simply digitizes the Hall voltage signals $V_{H_1}$, $V_{H_2}$ and then transmits the digitized signals to a digital signal processor that is external to the haptic engine (100; 200).

In this manner, a digital signal processor that receives the Hall-voltage signals $V_{H_1}$, $V_{H_2}$ can determine a displacement $\Delta X$ of the mass (110; 210) along the driving direction (e.g., the x-axis) as a tangential-displacement signal $H_\parallel$, where $H_\parallel$ is calculated as $$H_\parallel = H_1 - H_2 \quad (3a).$$

In EQ. (3a), the terms $H_1$ and $H_2$ are obtained by performing the following corrections on the Hall voltage signals $V_{H_1}$, $V_{H_2}$:

$$H_1 = V_{H_1} - H_{01} - \eta_1 I \quad (3b),$$

$$H_2 = V_{H_2} - H_{02} - \eta_2 I \quad (3c).$$

In EQs. (3b), (3c), each of the Hall voltage signals $V_{H_1}$, $V_{H_2}$ (expressed in counts) is corrected by a respective offset $H_{01}$, $H_{02}$ (expressed in counts), that represents the signal output by a Hall-effect sensor (108A, 108B; 208A, 208B) when the sensor is at rest. Additionally, each of the Hall voltage signals $V_{H_1}$, $V_{H_2}$ (expressed in counts) is further corrected by a respective coupling term, that represents a strength of the coupling between the current I in the driving coil (112; 212) and the Hall-effect sensors (108A, 108B; 208A, 208B). Each of the coupling terms is obtained as a product of a respective electromagnetic coupling factor $\eta_1$, $\eta_2$ (expressed in counts/A), and an intensity (expressed in A) of the current I in the driving coil (112; 212). Note that, because the electromagnetic coupling factors $\eta_1$, $\eta_2$, can have similar values, the coupling terms from EQs. (3b), (3c) mostly cancel out in EQ. (3a). Note that the tangential-displacement signal $H_\parallel$ obtained based on EQ. (3a) represents a corrected version of the difference signal 615 shown in FIG. 6A.

The digital signal processor that receives the Hall-voltage signals $V_{H_1}$, $V_{H_2}$ can detect displacements of the mass that are orthogonal to the displacement $\Delta X$ along the x-axis, e.g., the displacement $\Delta Z$ along the z-axis, the displacement $\Delta Y$ along the z-axis and the yaw $\Delta \Phi$ about a rotation axis parallel to the z-axis. These orthogonal displacements are detected by performing spectral analysis of an orthogonal-displacement signal $H_\perp$ obtained based on the following equation:

$$H_\perp = \frac{H_1 + H_2}{H_{01} + H_{02}}. \quad (4)$$

In EQ. (4), the terms $H_1$, $H_2$ are obtained using EQs. (3b), (3c), respectively. EQ. (4) can be used to detect which of the orthogonal displacements $\Delta Z$, $\Delta Y$ and $\Delta \Phi$ of the mass (110; 210) are present at a given time by detecting respective high order modes of the signal $H_\perp$. Note that the orthogonal-displacement signal $H_\perp$ obtained based on EQ. (4) represents a corrected version of the sum signal 625 shown in FIG. 6A.

Note that the sensing systems (105, 205) described here use Hall-effect sensors (108A, 108B; 208A, 208B) to detect changes in the sensing magnetic field produced by a single sensing magnet (114, 214). However, any magnetic field sensors, e.g., fluxgates, magneto-resistors, etc., can be used in conjunction with, or instead of, the above-noted Hall-effect sensors. In such cases, the Hall voltage signals $V_{H_1}$, $V_{H_2}$, that are output above by the Hall-effect sensors (108A, 108B; 208A, 208B), are respectively replaced by sensing signals $V_{SENSOR_1}$, $V_{SENSOR_2}$, which are output by the corresponding magnetic field sensors.

FIG. 7 shows a process 700 for identifying unwanted vibration modes induced in a haptic engine (100; 200) and for damping the identified modes. The process 700 can be performed by one or more digital signal processors in conjunction with the haptic engine (100; 200). The process 700 includes a calibration portion 705 followed by an operational portion 735.

The calibration portion 705 of the process 700 can be performed during the fabrication of the haptic engine (100; 200) or during the fabrication of a computing device, e.g., smartphone, laptop, watch, etc., that includes the haptic engine.

At 710, respective sum signals 625(j) are acquired for multiple driving frequencies f(j), where j=1 . . . N>1 and $f_{MIN} < f(j) < f_{MAX}$. Each sum signal 625 is acquired using a pair of Hall-effect sensors (108A, 108B; 208A, 208B) in a sensing system (105; 205) of the haptic engine (100; 200). The minimum frequency $f_{MIN}$ can be 0, 10, 20 or 30 Hz. The maximum frequency $f_{MAX}$ can be 400, 600, 800 or 1000 Hz. In some implementations, each sum signal 625(j) is corrected based on EQ. (4) to obtain an orthogonal-displacement signal $H_\perp$.

Figure 8A:
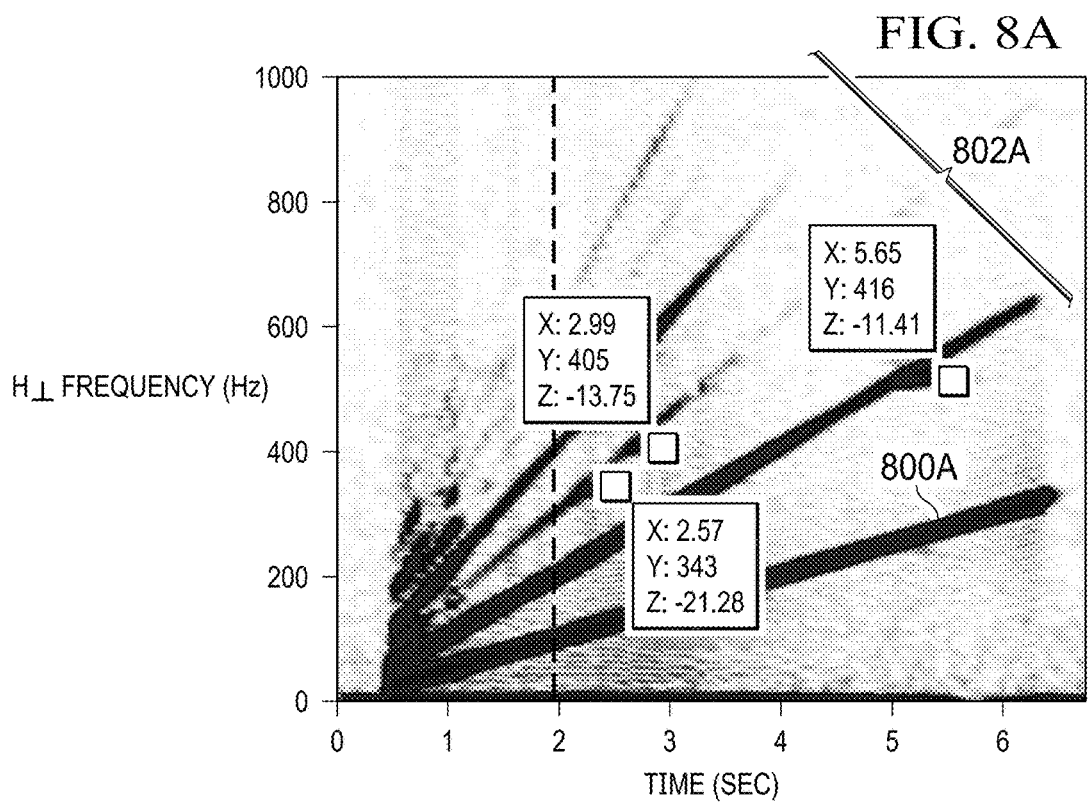
FIGS. 8A-8D show results of identifying unwanted vibration modes.

FIG. 8A shows a false-color plot of the orthogonal-displacement signal $H_\perp$ (along the axis perpendicular to the page) as a function of time (along the horizontal axis) and driving frequency (along the vertical axis). The data plotted in FIG. 8A was generated for the haptic engine 100 during a driving-frequency sweep corresponding to the response 800A of the orthogonal-displacement signal $H_\perp$. During this sweep, the driving frequency is changed linearly in time, over a time interval of 6 s, from a minimum frequency of 25 Hz to a maximum frequency 325 Hz. In addition to the response 800A, a set 802A of higher frequency modes have been induced during the driving-frequency sweep. For instance, along a vertical section of the false-color plot, e.g., at t=2s, the orthogonal-displacement signal $H_\perp$ has a direct response at the driving frequency, e.g., f=100 Hz, and a series of harmonics at 200 Hz, 300 Hz, 400 Hz, etc., having smaller and smaller amplitudes. Note that for some modes, e.g., at $f_Z$=343 Hz, $f_Y$=405 Hz and $f_\Phi$=513 Hz, all of which are larger than the maximum frequency of the driving-frequency sweep, the response stretches in time, indicating that these are resonant modes. In the example illustrated in FIG. 8A, the foregoing resonant modes correspond, respectively, to a displacement $\Delta Z$ along the z-axis, a displacement $\Delta Y$ along the y-axis and a displacement $\Delta \Phi$ corresponding to yaw (i.e., rotation about an axis parallel to the z-axis).

Figure 8B:
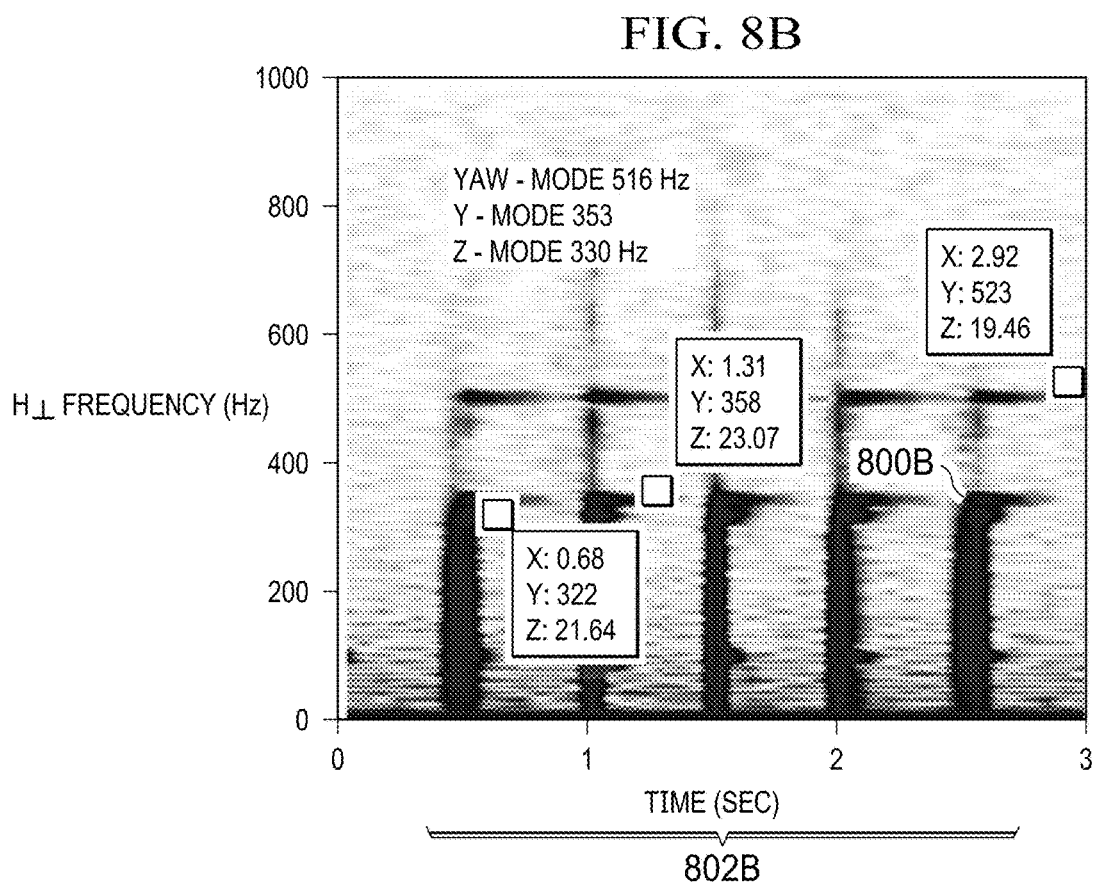

FIG. 8B shows a false-color plot of the orthogonal-displacement signal $H_\perp$ (along the axis perpendicular to the page) as a function of time (along the horizontal axis) and driving frequency (along the vertical axis). The data plotted in FIG. 8B was generated for the haptic engine 100 during a sequence 802B of five taps separated by a period 0.5 s. The response 800C for each of the taps includes many frequencies spanning beyond the upper bound, e.g., 300 Hz, of an operational frequency range. Note that for some modes, e.g., at $f_Z$=322 Hz, $f_Y$=358 Hz and $f_\Phi$=523 Hz, all of which are larger than the maximum operational frequency, the response stretches in time, indicating that these are resonant modes. In the example illustrated in FIG. 8B, the foregoing resonant modes correspond, respectively, to a displacement $\Delta Z$ along the z-axis, a displacement $\Delta Y$ along the y-axis and a displacement $\Delta\Phi$ corresponding to yaw (i.e., rotation about an axis parallel to the z-axis).

Referring again to FIG. 7, at 720, a spectrum S(f) is obtained for each respective sum signal 625(j). For instance, spectral analysis can be performed, e.g., Fast Fourier transform, etc., to identify the type of the unwanted modes that are responsible for an increase or decrease of the sum signal 625(j). In the implementations in which each sum signal 625(j) has been corrected based on EQ. (4) to obtain the orthogonal-displacement signal $H_\perp$, the spectrum S(f) is obtained for the orthogonal-displacement signal $H_\perp$.

Figure 8C:
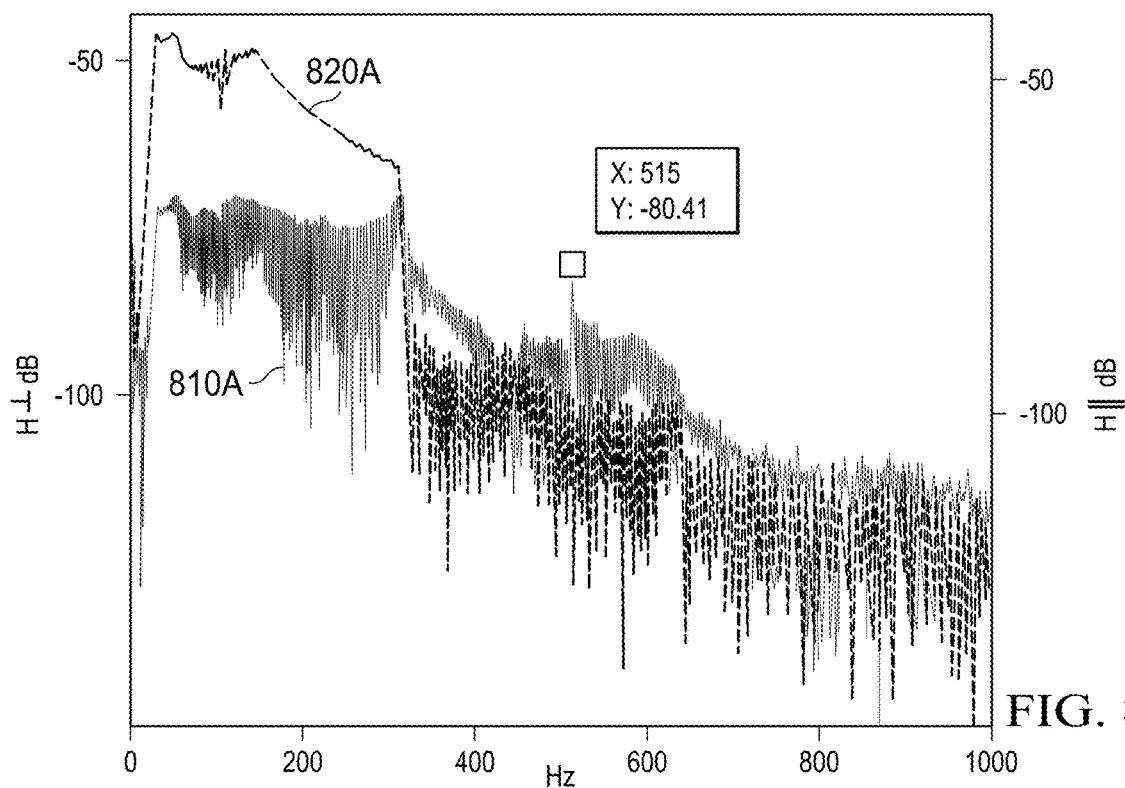
Figure 8D:
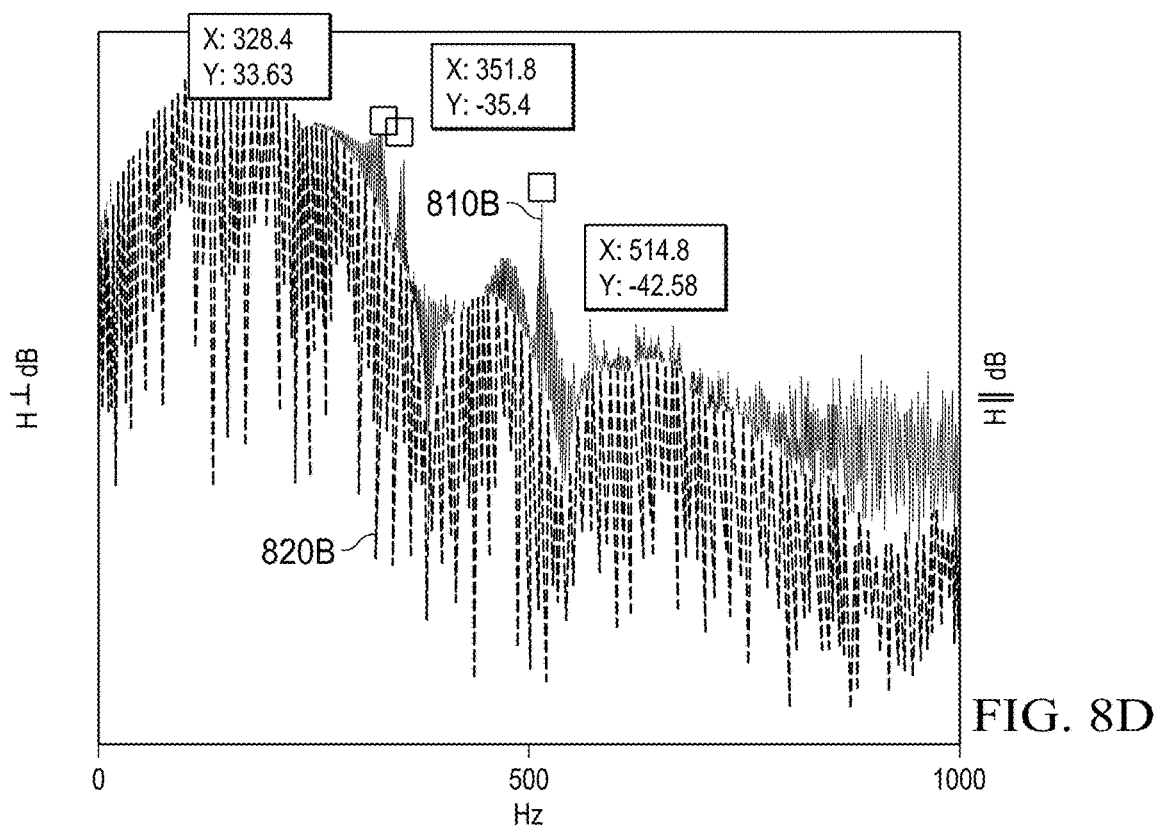

FIG. 8C shows an overlay of a spectrum 810A of the orthogonal-displacement signal $H_\perp$ for the driving-frequency sweep illustrated in FIG. 8A, and a spectrum 820A of the corresponding tangential-displacement signal $H_\parallel$. FIG. 8D shows an overlay of a spectrum 810B of the orthogonal-displacement signal $H_\perp$ for a tap illustrated in FIG. 8B, and a spectrum 820B of the corresponding tangential-displacement signal $H_\parallel$.

Referring again to FIG. 7, at 730, one or more resonant frequencies are identified based on the obtained spectra, e.g., frequency $f(Z)>f_{MAX}$ for Z-motion mode, frequency $f(Y)>f(Z)$ for Y-motion mode, and $f(\Phi)>f(Y)$ for yaw mode. For example, the spectrum 810A illustrated in FIG. 8C clearly shows a peak at $f_\Phi$=513 Hz corresponding to a yaw mode of a haptic engine like the haptic engine 100. As another example, the spectrum 810B illustrated in FIG. 8D clearly shows a peak at $f_Z$=328 Hz corresponding to a $\Delta Z$ mode, a peak at $f_Y$=359 Hz corresponding to a $\Delta Y$ mode, and a peak at $f_\Phi$=515 Hz corresponding to another yaw mode of a haptic engine like the haptic engine 100.

Referring again to FIG. 7, at 732, the identified one or more resonant frequencies $f_Z$, $f_Y$ and/or $f_\Phi$ are stored in a data store, either locally to the haptic engine (100; 200) or external from the haptic engine. The stored data can be retrieved by one or more digital signal processors that perform the operational portion 735 of the process 700.

The operational portion 735 of the process 700 can be performed iteratively during operation of a haptic engine (100; 200), e.g., as the haptic engine of a computing device, e.g., smartphone, laptop, watch, etc., is being started from rest, driven and/or brought to rest.

At 740, the haptic engine (100; 200) is operated at an operational driving frequency $f_{OP}$. While doing so, a sum signal 625($f_{OP}$) is acquired.

At 750, a spectrum s(f) is obtained for the sum signal 625($f_{OP}$). For example, the spectrum s(f) can be obtained by applying a fast-Fourier transform (FFT) to the sum signal 625($f_{OP}$).

At 760, the spectrum s(f) of the sum signal 625($f_{OP}$) is parsed to determine whether any modes are present that have a frequency larger than $f_{MAX}$. For instance, the driving frequency f of the haptic engine (100; 200) can have a specified upper bound, e.g., $f_{MAX}$=300 Hz. Here, one or more digital signal processors retrieve, from the data store, a value for $f_{MAX}$. At 760N, no action will be taken, and the operational portion 735 of the process 700 is restarted from 740.

At 760Y, the portion of the spectrum s(f) for frequencies larger than $f_{MAX}$ is parsed, at 770, to determine whether any modes are present that have a frequency that matches a previously identified resonant frequencies $f_Z$, $f_Y$ and/or $f_\Phi$ corresponding to unwanted modes of Z-motion, Y-motion and/or yaw. Here, one or more digital signal processors retrieve, from the data store, the values for $f_Z$, $f_Y$ and/or $f_\Phi$. At 770N, no action will be taken, and the operational portion 735 of the process 700 is restarted from 740.

At 770Y, the identified one or more unwanted modes of the portion of the spectrum s(f) for frequencies larger than $f_{MAX}$ are suppressed, at 780, by applying an appropriate damping signal to the haptic engine. Examples of damping signals include anti-phase signals corresponding to the unwanted identified modes. Anti-phase signals and other noise cancellation signals are reserved signals, i.e., developers will not be allowed to drive the haptic engine at frequencies in the range of the frequencies of the reserved signals.

Note that the tangential-displacement signal $H_\parallel$, that has been obtained above using EQ. (3a), for determining displacement $\Delta X$ of the mass (110; 210) of the haptic engine (100; 200) along the driving direction can be further corrected, as described next.

Figure 9A:
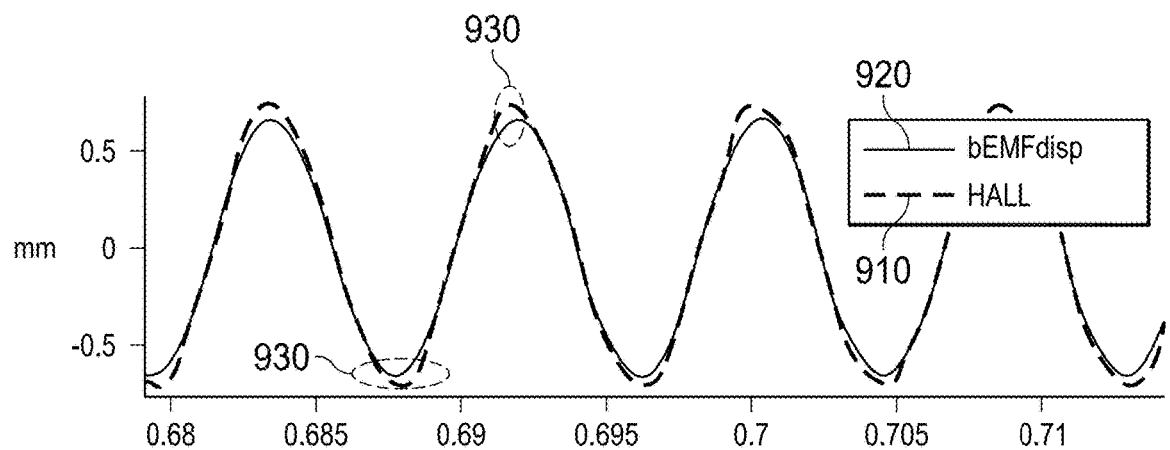
FIGS. 9A-9B show results of correcting displacement signals produced by a haptic engine like the ones shown in FIGS. 1A-1B and FIGS. 2A-2B.

For example, a look up table (LUT), which is produced based on EQ. (3a), can be used to obtain the displacement of the mass $\Delta X$ along the x-axis. However, in some implementations, the tangential-displacement signal $H_\parallel$ can be distorted due to changes in the sensing magnetic field B caused by off-axis movement of the mechanical flexures (109/209), or due to the interaction of the sensing magnetic field B with the static field $B_Z$ produced by the magnetic plates 104. Here, the off-axis movement can be potentially due to an out-of-plane flexure force. Either of these reasons causes the slope dB/dX of the sensing magnetic field profile B(X) 602 to decrease, which in turn leads to a decrease in the sensitivity of the displacement measurements. FIG. 9A shows an overlay of (i) a tangential-displacement signal $H_\parallel$ 910 obtained based on Hall sensing measurements, in accordance with EQ. (3a), and (ii) a reference tangential-displacement signal 920 obtained based on back-electromotive force (bEMF) measurements. Distortions 930 of the tangential-displacement signal $H_\parallel$ 910 are highlighted in FIG. 9A as differences relative to the reference signal 920.

To compensate for the off-axis movement, the tangential-displacement signal $H_\parallel$, and the LUT in which it is used, can be compensated to obtain a compensated tangential-displacement signal $H_{COMP}$ that satisfies the following equation:

$$H_{comp} = \frac{H_\parallel}{1 + KH_\perp}. \tag{5}$$

In EQ. (5), the tangential-displacement signal $H_\parallel$ is obtained using EQ. (3a), and the orthogonal-displacement signal $H_\perp$ is obtained using EQ. (4). Here, K is an adjustable gain factor. For the haptic engine (100; 200) described in this specification, the gain factor K=1 has been found to produce good results. Note that K can be calibrated for each haptic engine (100; 200) during production test.

If it is desired to use a digital signal processor that does not support division, the compensated tangential-displacement signal $H_{COMP}$ can be approximated using the following equation:

$$H_{comp} \approx H_{\|}(1 - KH_{\perp}) = H_{\|}\left(1 - K\frac{H_1 + H_2}{H_{01} + H_{02}}\right). \quad (6)$$

In EQ. (6), the factor $$\frac{1}{H_{01} + H_{02}}$$

is consistent and can be precomputed.

Figure 9B:
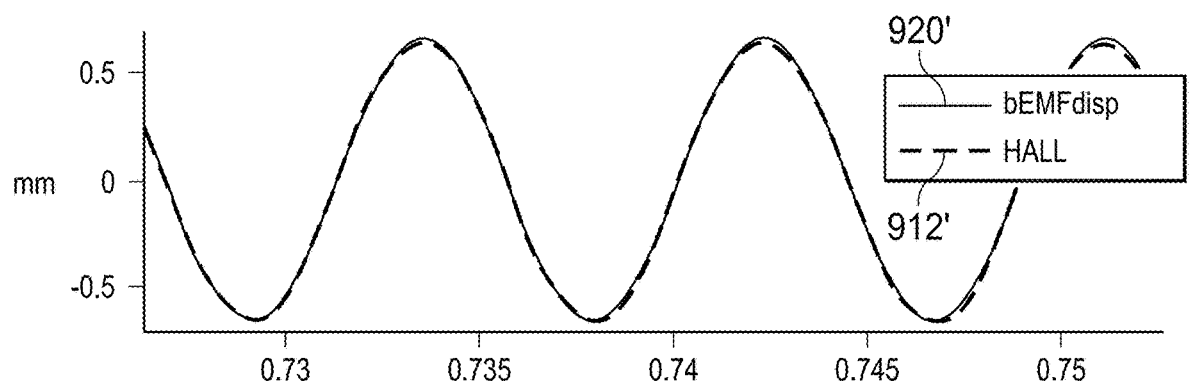
Figure 11A:
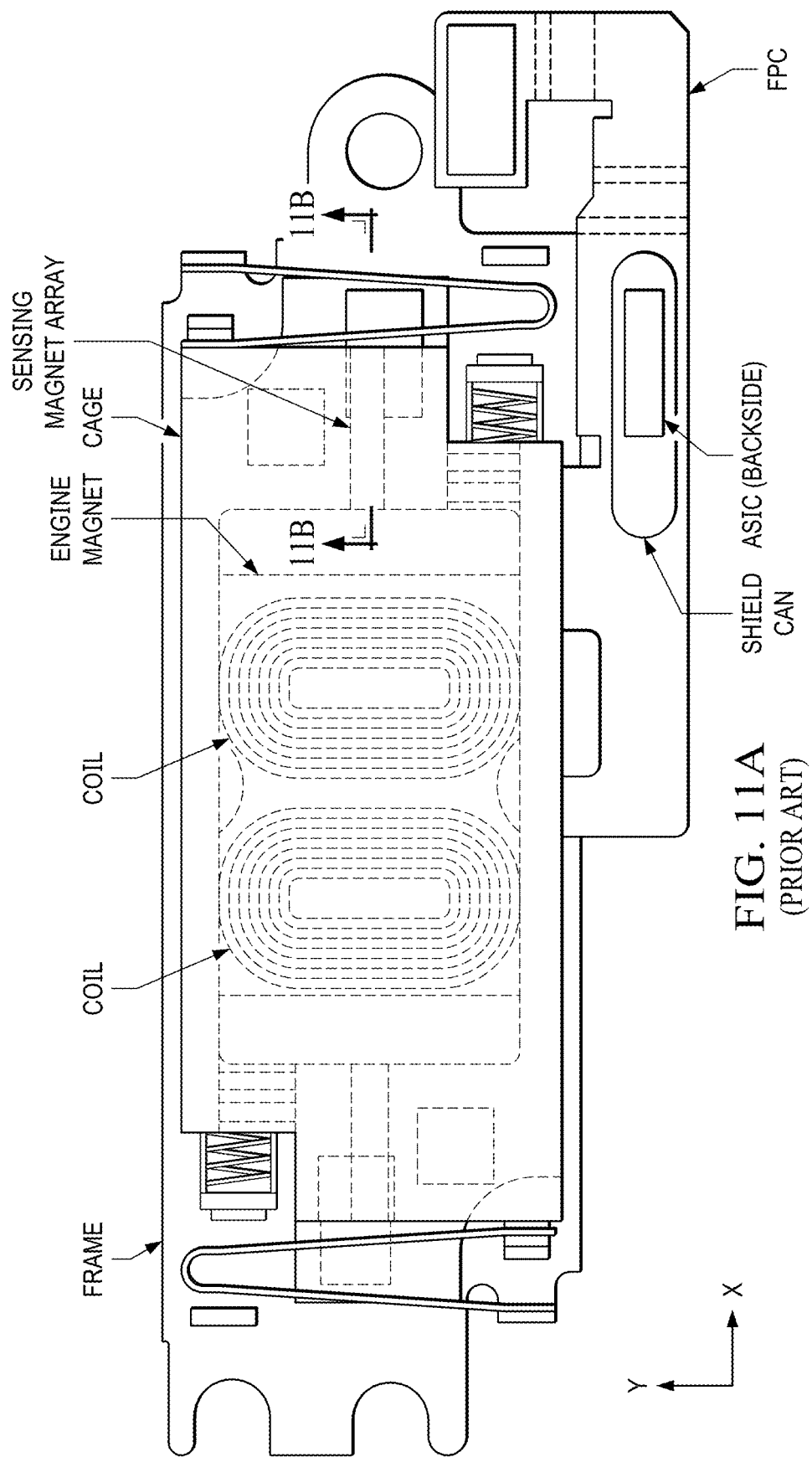
FIGS. 11A-11B show aspects of a conventional haptic engine.
Figure 11B:
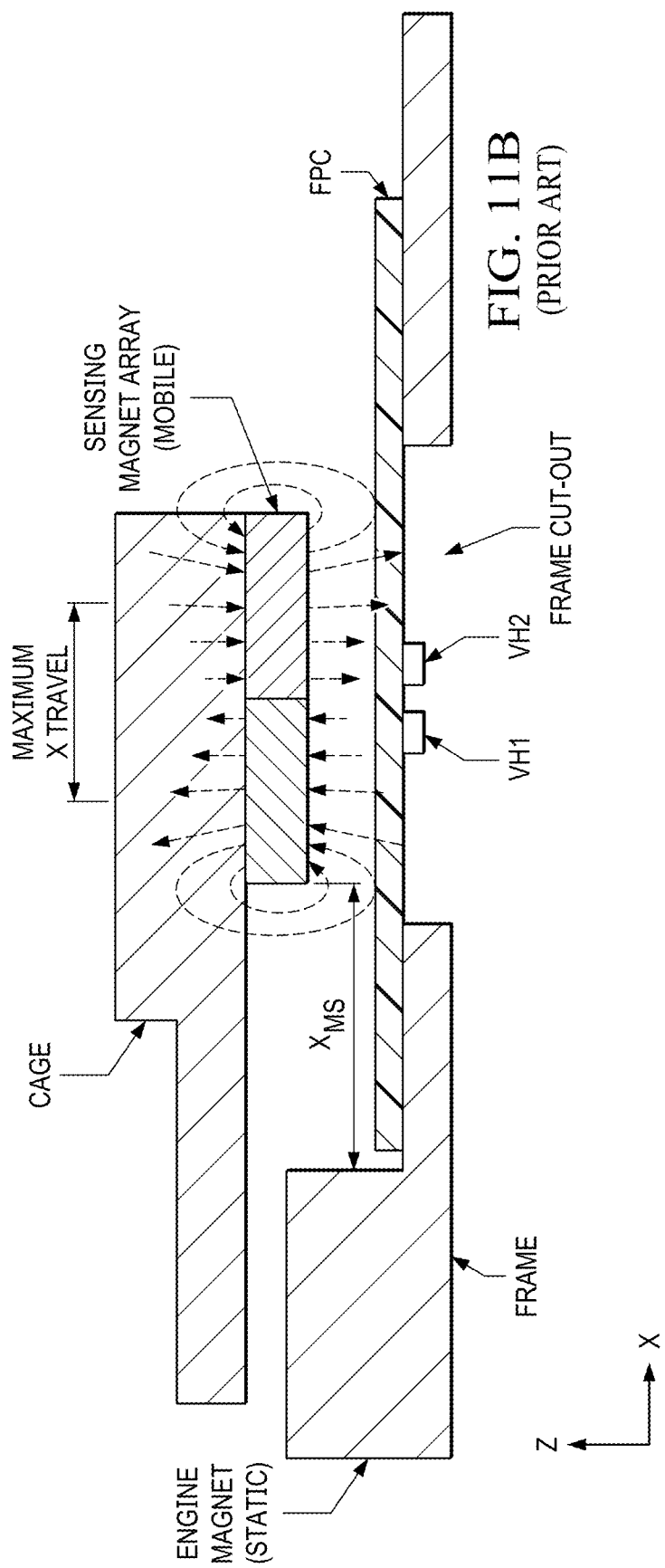

By applying one of EQs. (5) or (6) to calculate a compensated tangential-displacement signal $H_{COMP}$, the distortions of this signal can be significantly smaller than the distortions of the tangential-displacement signal $H_{\|}$ calculated in accordance with EQ. (3a). This is illustrated in FIG. 9B, which shows an overlay of (i) a tangential-displacement signal $H_{COMP}$ 912' obtained based on Hall sensing measurements, in accordance with EQ. (5), and (ii) a reference tangential-displacement signal 920' obtained based on bEMF measurements, for a driving frequency of 125 Hz. Here, the error between the tangential-displacement signal $H_{COMP}$ 912' and the reference signal 920' is about 3%.

In summary, the disclosed haptic engines include one sensing magnet, and multiple sensors for sensing mass motion. In some of the disclosed haptic engines, a sensing magnet flux direction is orthogonal to the static magnet flux direction. Various implementations of the disclosed haptic engines include two, three or more sensors to distinguish between X, Y/yaw, Z movements of the sensing magnet. In some implementations of the disclosed haptic engines, the one or more sensors are integrated inside an ASIC to save space and cost. In some implementations of the disclosed haptic engines, the two or more sensors, and in some cases the ASIC, can be mounted on the inside of the engine to save space.

FIG. 10 is a diagram of an example of mobile device architecture that uses one of the haptic engines described in reference to FIGS. 1-9, according to an embodiment. Architecture 1000 may be implemented in any mobile device for generating the features and processes described in reference to FIGS. 1-9, including but not limited to smart phones and wearable computers (e.g., smart watches, fitness bands). Architecture 1000 may include memory interface 1002, data processor(s), image processor(s) or central processing unit (s) 1004, and peripherals interface 1006. Memory interface 1002, processor(s) 1004 or peripherals interface 1006 may be separate components or may be integrated in one or more integrated circuits. One or more communication buses or signal lines may couple the various components.

Sensors, devices, and subsystems may be coupled to peripherals interface 1006 to facilitate multiple functionalities. For example, motion sensor(s) 1010, light sensor 1012, and proximity sensor 1014 may be coupled to peripherals interface 1006 to facilitate orientation, lighting, and proximity functions of the device. For example, in some embodiments, light sensor 1012 may be utilized to facilitate adjusting the brightness of touch surface 1046. In some embodiments, motion sensor(s) 1010 (e.g., an accelerometer, rate gyroscope) may be utilized to detect movement and orientation of the device. Accordingly, display objects or media may be presented according to a detected orientation (e.g., portrait or landscape).

Haptic engine 1017, under the control of haptic engine instructions 1072, provides the features and performs the processes described in reference to FIGS. 1-9, such as, for example, implementing haptic feedback (e.g., vibration). Haptic engine 1017 can include one or more actuators, such as piezoelectric transducers, electromechanical devices, and/or other vibration inducing devices, which are mechanically connected to an input surface (e.g., touch surface 1046). Drive electronics (e.g., 170) coupled to the one or more actuators cause the actuators to induce a vibratory response into the input surface, providing a tactile sensation to a user touching or holding the device.

Other sensors may also be connected to peripherals interface 1006, such as a temperature sensor, a barometer, a biometric sensor, or other sensing device, to facilitate related functionalities. For example, a biometric sensor can detect fingerprints and monitor heart rate and other fitness parameters. In some implementations, a Hall sensing element in haptic engine 1017 can be used as a temperature sensor.

Location processor 1015 (e.g., GNSS receiver chip) may be connected to peripherals interface 1006 to provide geo-referencing. Electronic magnetometer 1016 (e.g., an integrated circuit chip) may also be connected to peripherals interface 1006 to provide data that may be used to determine the direction of magnetic North. Thus, electronic magnetometer 1016 may be used to support an electronic compass application.

Camera subsystem 1020 and an optical sensor 1022, e.g., a charged coupled device (CCD) or a complementary metal-oxide semiconductor (CMOS) optical sensor, may be utilized to facilitate camera functions, such as recording photographs and video clips.

Communications functions may be facilitated through one or more communication subsystems 1024. Communication subsystem(s) 1024 may include one or more wireless communication subsystems. Wireless communication subsystems 1024 may include radio frequency receivers and transmitters and/or optical (e.g., infrared) receivers and transmitters. Wired communication systems may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data.

The specific design and embodiment of the communication subsystem 1024 may depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, IEEE802.xx communication networks (e.g., Wi-Fi, Wi-Max, ZigBee™), 3G, 4G, 4G LTE, code division multiple access (CDMA) networks, near field communication (NFC), Wi-Fi Direct and a Bluetooth™ network. Wireless communication subsystems 1024 may include hosting protocols such that the device may be configured as a base station for other wireless devices. As another example, the communication subsystems may allow the device to synchronize with a host device using one or more protocols or communication technologies, such as, for example, TCP/IP protocol, HTTP protocol, UDP protocol, ICMP protocol, POP protocol, FTP protocol, IMAP protocol, DCOM protocol, DDE protocol, SOAP protocol, HTTP Live Streaming, MPEG Dash and any other known communication protocol or technology.

Audio subsystem 1026 may be coupled to a speaker 1028 and one or more microphones 1030 to facilitate voice-enabled functions, such as voice recognition, voice replication, digital recording, and telephony functions. In an embodiment, audio subsystem includes a digital signal processor (DSP) that performs audio processing, such as implementing codecs.

I/O subsystem 1040 may include touch controller 1042 and/or other input controller(s) 1044. Touch controller 1042 may be coupled to a touch surface 1046. Touch surface 1046 and touch controller 1042 may, for example, detect contact and movement or break thereof using any of a number of touch sensitivity technologies, including but not limited to, capacitive, resistive, infrared, and surface acoustic wave technologies, as well as other proximity sensor arrays or other elements for determining one or more points of contact with touch surface 1046. In one embodiment, touch surface 1046 may display virtual or soft buttons and a virtual keyboard, which may be used as an input/output device by the user.

Other input controller(s) 1044 may be coupled to other input/control devices 1048, such as one or more buttons, rocker switches, thumb-wheel, infrared port, USB port, and/or a pointer device such as a stylus. The one or more buttons (not shown) may include an up/down button for volume control of speaker 1028 and/or microphone 1030.

In some embodiments, device 1000 may present recorded audio and/or video files, such as MP3, AAC, and MPEG video files. In some embodiments, device 1000 may include the functionality of an MP3 player and may include a pin connector for tethering to other devices. Other input/output and control devices may be used.

Memory interface 1002 may be coupled to memory 1050. Memory 1050 may include high-speed random access memory or non-volatile memory, such as one or more magnetic disk storage devices, one or more optical storage devices, or flash memory (e.g., NAND, NOR). Memory 1050 may store operating system 1052, such as Darwin, RTXC, LINUX, UNIX, OS X, iOS, WINDOWS, or an embedded operating system such as VxWorks. Operating system 1052 may include instructions for handling basic system services and for performing hardware dependent tasks. In some embodiments, operating system 1052 may include a kernel (e.g., UNIX kernel).

Memory 1050 may also store communication instructions 1054 to facilitate communicating with one or more additional devices, one or more computers or servers, including peer-to-peer communications. Communication instructions 1054 may also be used to select an operational mode or communication medium for use by the device, based on a geographic location (obtained by the GPS/Navigation instructions 1068) of the device.

Memory 1050 may include graphical user interface instructions 1056 to facilitate graphic user interface processing, including a touch model for interpreting touch inputs and gestures; sensor processing instructions 1058 to facilitate sensor-related processing and functions; phone instructions 1060 to facilitate phone-related processes and functions; electronic messaging instructions 1062 to facilitate electronic-messaging related processes and functions; web browsing instructions 1064 to facilitate web browsing-related processes and functions; media processing instructions 1066 to facilitate media processing-related processes and functions; GNSS/Navigation instructions 1068 to facilitate GNSS (e.g., GPS, GLOSSNAS) and navigation-related processes and functions; camera instructions 1070 to facilitate camera-related processes and functions; and haptic engine instructions 1072 for commanding or controlling haptic engine 1017 and to provide the features and performing the processes described in reference to FIGS. 1-9.

Each of the above identified instructions and applications may correspond to a set of instructions for performing one or more functions described above. These instructions need not be implemented as separate software programs, procedures, or modules. Memory 1050 may include additional instructions or fewer instructions. Furthermore, various functions of the device may be implemented in hardware and/or in software, including in one or more signal processing and/or application specific integrated circuits (ASICs). Software instructions may be in any suitable programming language, including but not limited to: Objective-C, SWIFT, C# and Java, etc.

While this document contains many specific implementation details, these should not be construed as limitations on the scope what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination. Logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:
1. A haptic engine comprising:
a frame;
a driving system comprising
a first magnet that is coupled with the frame and produces a first magnetic field along a first direction, and
a mass supporting a coil, the mass arranged to be driven relative to the frame along a driving direction orthogonal to the first direction when a driving current is being supplied through the coil; and
a sensing system comprising
a second magnet that is coupled with the mass and produces a second magnetic field along a second direction orthogonal to the driving direction, and
a first Hall-effect sensor coupled with the frame at a first location of the frame, and a second Hall-effect sensor coupled with the frame at a second location of the frame, the second location being separated from the first location along the driving direction, each of the sensors being spaced apart from the second magnet along the second direction and configured to produce a respective Hall voltage signal correspond- ing to changes of the second magnetic field at the location of the respective one of the sensors caused when driving the mass.

2. The haptic engine of claim 1, wherein the second direction is parallel to the first direction.

3. The haptic engine of claim 1, wherein the second direction is orthogonal to the first direction.

4. The haptic engine of claim 3, wherein
the sensing system further comprises a third Hall-effect sensor coupled with the frame at a third location of the frame, the third location being between the first and second locations along the driving direction and laterally offset from it, and
the third Hall-effect sensor is configured to produce a third Hall voltage signal corresponding to changes of the second magnetic field at the third location caused when driving the mass.

5. The haptic engine of claim 3, wherein the sensing system further comprises
a substrate through which the sensors are coupled with the frame, the substrate including conducting lines, and
an ASIC connected to the sensors through the conducting lines to process the respective Hall voltage signals produced by the sensors, the ASIC being disposed on the substrate at a location adjacent to the locations of the sensors.

6. The haptic engine of claim 5, wherein the frame has
an aperture within which the sensors and the ASIC are located, and
a shield can that covers the aperture to shields the sensors and the ASIC from electromagnetic noise from the environment outside the haptic engine.

7. The haptic engine of claim 3, wherein the sensing system further comprises
a substrate through which the sensors are coupled with the frame, and
a sensor-integrated ASIC disposed on the substrate, the sensor-integrated ASIC including the sensors and being configured to process the respective Hall voltage signals produced by the sensors.

8. The haptic engine of claim 7, wherein the frame has
an aperture within which the sensor-integrated ASIC is located, and
a shield plate that covers the aperture to shields the sensor-integrated ASIC from electromagnetic noise from the environment outside the haptic engine.

9. The haptic engine of claim 3, wherein the mass is shaped like a cage, and the second magnet is coupled with the mass (i) on a side surface of the cage that is parallel to the driving direction and orthogonal to the second direction, and (ii) adjacent to a corner of the cage that is nearest the first and second locations of the frame.

10. The haptic engine of claim 1, wherein a gradient of the second magnetic field along the driving direction has a maximum positive value at the first location and a maximum negative value at the second location.

11. The haptic engine of claim 1, wherein
the mass is to be driven along the driving direction over a distance that is smaller than or equal to a separation between the first and second locations, and
when the mass is at rest relative to the frame, the second magnet is equally spaced, along the driving direction, from the first Hall-effect sensor and the second Hall-effect sensor.

12. A displacement measurement system comprising:
the haptic engine of claim 1; and
a digital signal processor configured to determine tangential displacements of the mass along the driving direction based on the Hall voltage signals produced by the Hall-effect sensors.

13. The displacement measurement system of claim 12, wherein the digital signal processor is configured to cause supplying, based on the determined tangential displacements, the driving current through the coil.

14. The displacement measurement system of claim 12, wherein the digital signal processor is configured to
obtain, while operating the haptic engine at an operational driving frequency, a difference signal as the difference between the Hall voltage signals, and
use the difference signal for determining the tangential displacements.

15. The displacement measurement system of claim 12, wherein the digital signal processor is configured to
detect modes of the mass' motion along the second direction, and
cause suppressing of the detected modes.

16. The displacement measurement system of claim 15, wherein the digital signal processor is configured to
obtain, while operating the haptic engine at an operational driving frequency smaller than a maximum operational frequency, a sum signal as the sum of the Hall voltage signals,
obtain a spectrum of the sum signal, and
use the spectrum of the sum signal for detecting the modes of the mass' motion along the second direction.

17. The displacement measurement system of claim 16, wherein the digital signal processor is configured to use for the detecting only a portion of the spectrum that is over frequencies larger than the maximum operational frequency.

18. The displacement measurement system of claim 16, wherein the digital signal processor is configured to
access, in a data store, predetermined frequencies corresponding to the modes of the mass' motion along the second direction for the haptic engine,
determine whether the spectrum of the sum signal has spectral features at one or more frequencies that match respective ones of the predetermined frequencies, and if so
identify each detected mode based on its matching predetermined frequency.

19. The displacement measurement system of claim 18, wherein the digital signal processor is configured to
obtain respective sum signals for multiple driving frequencies lower than the maximum operational frequency,
obtain a spectrum for each respective sum signal,
identify, using portions of the spectra that are over frequencies larger than the maximum operational frequency, one or more frequencies of spectral features corresponding to respective modes of the mass' motion along the second direction, and
store the identified frequencies as the predetermined frequencies for the haptic engine.

20. A computing system that includes the displacement measurement system of claim 12.

21. The computing system of claim 20 comprises one of a smartphone, a tablet, a laptop and a watch.

22. A device comprising:
a haptic interface;
a haptic engine coupled with the haptic interface, the haptic engine comprising
a frame;

a first magnet that is coupled with the frame and produces a first magnetic field along a first direction, a mass supporting a coil, the mass arranged to be driven relative to the frame along a driving direction orthogonal to the first direction when a driving current is being supplied through the coil, a second magnet that is coupled with the mass and produces a second magnetic field along a second direction orthogonal to the driving direction, and a first magnetic field sensor coupled with the frame at a first location of the frame, and a second magnetic field sensor coupled with the frame at a second location of the frame, the second location being separated from the first location along the driving direction, each of the sensors being spaced apart from the second magnet along the second direction and configured to produce a respective sensor signal corresponding to changes of the second magnetic field at the location of the respective one of the sensors caused when driving the mass; and a digital signal processor communicatively coupled with the haptic engine, the digital signal processor configured to determine tangential displacements of the mass along the driving direction based on the sensor signals produced by the magnetic field sensors.

23. The device of claim 22, wherein the second direction is parallel to the first direction.

24. The device of claim 22, wherein the second direction is orthogonal to the first direction.

25. The device of claim 24, wherein the mass is shaped like a cage, and the second magnet is coupled with the mass (i) on a side surface of the cage that is parallel to the driving direction and orthogonal to the second direction, and (ii) adjacent to a corner of the cage that is nearest the first and second locations of the frame.

26. The device of claim 22, wherein the magnetic field sensors are Hall-effect sensors.

27. The device of claim 22, further comprising a driver module coupled with the digital signal processor and the haptic engine, the driver module configured to supply, based on the determined tangential displacements, the driving current through the coil.

28. The device of claim 22 is a smartphone, a tablet, a laptop and a watch.

* * * * *